(12) United States Patent
Crienen et al.

(10) Patent No.: US 8,572,034 B2
(45) Date of Patent: Oct. 29, 2013

(54) METHOD OF MANAGING A DISTRIBUTED STORAGE SYSTEM

(75) Inventors: Godefridus Antonius Maria Crienen, Baarlo (NL); Freddy Snijder, Eindhoven (NL); Esko Olavi Dijk, Eindhoven (NL); Marc Andre Peters, Eindhoven (NL); Wilhelmus Henrica Gerarda Maria Van Den Boomen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1062 days.

(21) Appl. No.: 12/095,132

(22) PCT Filed: Nov. 28, 2006

(86) PCT No.: PCT/IB2006/054470
§ 371 (c)(1),
(2), (4) Date: May 28, 2008

(87) PCT Pub. No.: WO2007/063483
PCT Pub. Date: Jun. 7, 2007

(65) Prior Publication Data
US 2008/0313192 A1    Dec. 18, 2008

(30) Foreign Application Priority Data

Nov. 29, 2005  (EP) ..................... 05111464

(51) Int. Cl.
*G06F 7/00* (2006.01)
*G06F 17/00* (2006.01)
*G06F 17/30* (2006.01)

(52) U.S. Cl.
USPC ............................ 707/621; 707/634; 725/141

(58) Field of Classification Search
USPC .............................. 707/999.204, 621; 725/141
See application file for complete search history.

(56) References Cited

U.S. PATENT DOCUMENTS

| 6,496,860 B2 | 12/2002 | Ludtke et al. |
| 6,820,278 B1 | 11/2004 | Ellis |

(Continued)

FOREIGN PATENT DOCUMENTS

| EP | 1357472 A1 | 10/2003 |
| WO | WO0239305 A1 | 5/2002 |
| WO | WO2004081818 A1 | 9/2004 |

OTHER PUBLICATIONS

"Blackberry"; Wikipedia [Online], Retrieved From the Internet: URL:http://en.wikipedia.org/w/index.php?title=BlackBerry&oldid=29534908, 8 page Document.

*Primary Examiner* — Brannon W Smith

(57) ABSTRACT

A method of managing a distributed storage system (1) comprising a plurality of storage devices ($D_1, D_2, \ldots, D_n$) on a network (N), wherein an autonomous function can be assigned to any storage device ($D_1, D_2, \ldots, D_n$) of the distributed storage system (N), which autonomous function comprises collecting content according to a configurable profile (3) for the storage device ($D_1, D_2, \ldots, D_n$) to which the autonomous function is assigned, and wherein a first storage device ($D_1, D_2, \ldots, D_n$) of the distributed storage system (1), before leaving the network (N), delegates the responsibility for an autonomous function of that first storage device ($D_1, D_2, \ldots, D_n$) to a second storage device ($D_1, D_2, \ldots, D_n$) of the distributed storage system (1), and wherein the second storage device assumes responsibility for the autonomous function of the first storage device ($D_1, D_2, \ldots, D_n$), and wherein the second storage device transfers data, accumulated due to its responsibility for the autonomous function of the first storage device ($D_1, D_2, \ldots D_n$), to the first storage device ($D_1, D_2, \ldots, D_n$) when the first storage device ($D_1, D_2, \ldots, D_n$) returns to the network (N). The invention also relates to a storage device ($D_1, D_2, \ldots, D_n$) for use in a distributed storage system (1), and to a distributed storage system (1) comprising such storage devices ($D_1, D_2, \ldots, D_n$).

14 Claims, 10 Drawing Sheets

(56) References Cited

U.S. PATENT DOCUMENTS

| | | |
|---|---|---|
| 2004/0117390 A1 | 6/2004 | Karaoguz et al. |
| 2004/0163130 A1 | 8/2004 | Gray et al. |
| 2005/0066350 A1 | 3/2005 | Meuleman |
| 2005/0076390 A1 | 4/2005 | Klausberger et al. |
| 2005/0114350 A1 | 5/2005 | Rose et al. |
| 2006/0075441 A1* | 4/2006 | Gauba et al. .................... 725/89 |
| 2006/0136966 A1* | 6/2006 | Folk .................... 725/58 |
| 2006/0218226 A1* | 9/2006 | Johnson et al. .................... 709/202 |
| 2006/0259927 A1* | 11/2006 | Acharya et al. .................... 725/61 |
| 2007/0122108 A1* | 5/2007 | Bontempi .................... 386/83 |
| 2008/0022203 A1* | 1/2008 | Fernandez .................... 715/716 |
| 2008/0080392 A1* | 4/2008 | Walsh et al. .................... 370/254 |
| 2008/0320002 A1* | 12/2008 | Bodlaender et al. .................... 707/10 |

* cited by examiner

METHOD OF MANAGING A DISTRIBUTED STORAGE SYSTEM

FIELD OF THE INVENTION

The invention relates to a method of managing a distributed storage system.

The invention also relates to storage device and to a distributed storage system using that storage device.

BACKGROUND OF THE INVENTION

Data storage devices are well known from the state of the art. Such storage devices are, for example, CDs, DVDs, floppy discs or USB sticks. The user can obtain data from a source on a network such as a personal computer, internet, etc., and store the data on the portable storage device. Such a device is, in effect, a "passive" storage medium, having no intelligence of its own and being therefore unable to exert any influence on, for instance, the kind of content or data stored (e.g. mp3 music files, video, jpeg pictures, documents, and so on). Therefore, every time a user wants to store content on such a device, he must carry out this process manually. The additional effort required on the part of the user considerably detracts from the ease of use of such a portable storage device, which, due to its passive nature, is only of limited usefulness.

Developments in the areas of electronic devices and entertainment are leading in the direction of small, portable storage devices which can be taken by a user from one environment to another, for example from a home environment into an office or recreation environment, allowing the user access to his content collection regardless of where he is. For example, he might bring his music collection, stored on a storage device such as an MP3 player, to a party and have music from a playlist on the storage device play on the sound system there.

Conceivably, such a storage device could access and manage its content autonomously, i.e., by independently accessing an external source of content on a network and retrieving the content, without the user being actively involved all the time. For example, it might suffice that a user designate, in a once-off configuration step, that a storage device is to collect a certain type of content from the network, such as video content. Thereafter, the storage device autonomously scans one or more external data sources for such content, and downloads and stores the content. The user can then retrieve the content at a time that suits him best.

However, when the user is underway with his portable storage device or in an environment other than his home environment, the storage device will not have access to the network and an external source of content. In such situations, the storage device will be unable to carry out its autonomous function of collecting further content for the portable storage device. Equally, when a storage device is no longer powered for some reason, for example its battery runs empty or the storage device is physically disconnected from a power supply, the storage device is effectively removed from the network and will be unable to carry out its autonomous function in such cases also.

OBJECT AND SUMMARY OF THE INVENTION

Therefore, it is an object of the invention to provide, in an uncomplicated and economical manner, a way of ensuring that the content collected for a storage device is collected even when the storage device is removed from the network.

To this end, the present invention provides a method of managing a distributed storage system comprising a plurality of storage devices on a network, wherein an autonomous function can be assigned to any storage device of the distributed storage system, which autonomous function comprises collecting and providing content according to a configurable profile for the storage device to which the autonomous function is assigned. According to the method, a first storage device of the distributed storage system, before leaving the network, delegates the responsibility for an autonomous function of that first storage device to a second storage device of the distributed storage system, and the second storage device assumes responsibility for the autonomous function of the first storage device, and subsequently transfers data, accumulated due to its responsibility for the autonomous function of the first storage device, back to the first storage device when the first storage device returns to the network.

A storage device "leaving" the network can be interpreted to mean that the storage device is physically removed from the network by a user, for example when the user takes the storage device with him when he leaves home to go on a journey. A storage device can also "leave" the network when it enters a stand-by mode, or when its power supply fails, for example when its battery runs out or it is disconnected from the power supply. For whatever reason a storage device leaves the network, it is absent from the network, and unable to carry out it autonomous function, from that time on. In the same way, a storage device can "return" to the network when the user returns home, carrying the storage device with him, or the storage device can be returned to the network, for example, by re-activating it, by re-connecting it to the power supply, or by replacing the empty batteries. Once the storage device is once more able to participate in the network, it can resume responsibility for its autonomous function.

An "autonomous function" is a function carried out by a particular storage device without user intervention, and can be, for example, the task of collecting one or more certain types of information, or the task of performing a certain type of processing on a collection of data. A storage device can specialise in a single particular function, e.g. "collect only rock music", or it might be responsible for more than one function, e.g. a certain storage device of the distributed storage system might be responsible for collecting the content types "collect movies" and "collect rock music" as well as for processing content "classify movies according to genre". Another autonomous function might also comprise sorting or collating content stored on other storage devices in the network. When a first storage device delegates the responsibility for its autonomous function to a second storage device, the second storage device is now responsible for carrying out the autonomous function of the first storage device, i.e. for collecting the content that would otherwise have been collected by the first storage device.

An obvious advantage of the method according to the invention is that, by delegating responsibility for its autonomous function to another storage device, a storage device ensures that its function will be carried out during its absence from the network. Upon returning to the network once more, this storage device may essentially immediately re-assume responsibility for its autonomous function, and be automatically provided with all content accrued or accumulated by the second storage device in its absence. Since the delegation of responsibility for the autonomous function of a storage device as well as the subsequent transfer of accumulated data is carried out in the background, i.e. without user participation, the entire process can be completely invisible to the user, thereby offering him a maximum of ease of use. A storage device, upon returning to the network, might also simply collect the content accumulated in its absence by the storage device appointed to carry out its autonomous function, without actually re-assuming responsibility for its autonomous function. This might be the case for a storage device which "knows" that it is only briefly returning to the network, and will be leaving shortly again.

An appropriate storage device comprises an interface for connecting to an external data source such as the internet, a content provider, other storage device, etc., and a data acquisition unit such as a processor with the necessary interfaces for acquiring data from that external data source according to a configurable profile describing an autonomous function of the storage device. The content thus collected can be stored in a memory module. The storage device also comprises an interface for communicating with another storage device and a responsibility delegation unit for delegating the responsibility for the autonomous function of the storage device to another storage device in a network. For the method according to the invention, a distributed storage system requires at least one such storage device, as well as at least one other storage device with a responsibility assumption unit allowing it to assume responsibility for an autonomous function when delegated to do so. Such a storage device should comprise a responsibility assumption unit for assuming the responsibility for the autonomous function of another storage device, for causing the data acquisition unit to acquire data from the external data source according to a configurable profile describing the autonomous function of the other storage device, and for transferring the data thus accumulated during its responsibility for the autonomous function of the other storage device to the first storage device once the first storage device has returned to the network.

The dependent claims and the subsequent description disclose particularly advantageous embodiments and features of the invention.

A storage device according to the invention can be used to collect one or more different kinds of data—also called content—and/or to process content in a certain manner. For example, one storage device might be used to download only certain kinds of video, for example romantic comedies, from an external source of data such as the internet or a movie subscription service. Another storage device might be accorded the task of collecting certain types of music, for example jazz music, from an external source of data such as the internet, or from other storage devices in the distributed storage system, and may be assigned another task as well, such as collating news bulletins or collecting French-language documentary films. Any storage device can be given one or more tasks to carry out, depending on its processing and storage capacity. The storage devices can communicate with each other over the network, and can share their processing and storage capacities, as necessary, so that each storage device carries out its autonomous function in an optimal manner. In the following, wherever the term "storage device" is used, it is to be understood that the storage device is preferably portable, i.e. of a size suitable for comfortable transportation, so that a user can carry the portable storage device in, for example, his pocket or in a briefcase or handbag.

The configurable profile provides information about the content to gather and the autonomous function to be carried out by the storage device. This profile can be stored in a memory of the storage device, and might contain information about the type of content that is to be stored in the memory of the storage device, e.g. audio, video, images, text or other types of data. Different levels of detail or granularity can be specified, for example a coarse granularity for the autonomous function "collect movies", a fine granularity for the autonomous function "collect music; genre popular; artist George Michael; decade 90s". For each content type listed in the profile, a network bandwidth can be specified by providing a target bit-rate or target communication technology, e.g. Bluetooth. This bandwidth specification determines the amount of network bandwidth that can be used by the storage device to autonomously collect content of the type specified in the profile.

Furthermore, a user can provide more specific information about the chosen content when configuring the profile. Configuring the profile for videos can be based on a selection from a standard set of genres, events or content moods ("romantic", "comedy", etc.). Configuring the profile for videos can be further based on keywords in the title, author information and spoken words in the content. For audio data, configuration of the profile can be also based on a selection from a standard set of genres, events or content moods, and can also be based on keywords in the title, artist information and spoken/sung words in the content. Configuration of the profile can also be based on file name and file extension, for example for the autonomous function of collecting music in the form of mp3 files or images in JPEG format.

The profile can also specify from where the storage device is to acquire its data. For example, a storage device can be instructed to trawl the internet to search for a certain type of image or file, or it might be instructed to examine electronic program guides (EPGs) to locate and record certain television or radio broadcasts, or to communicate with another stationary storage device on the network, such as a DVD recorder.

Also, the profile might contain information about how to deal with content created on a certain date. In this way, it is possible to discriminate, for example, by file creation date or file change date, so that storage devices in a distributed storage system and constituting a network can organize the available content according to their profiles and based on time, giving an automatic archival system. Evidently, profiles based on content and creation date can be combined. In this way, a profile can be configured so that the autonomous function of the storage device is to store, for example, only the latest news bulletin updates.

The delegation of responsibility for an autonomous function of a first "delegating" storage device to a second "delegated" storage device preferably comprises transferring profile-related information from the first storage device to the second storage device. This profile-related information can be, in a simple form, just the description of the autonomous function. For example, the profile-related information transferred from the first storage device to the second storage device can be information such as "collect comedy movies".

However, if the second storage device simply collects such content without knowing what the first storage device has already collected prior to its delegation of its autonomous function, it may happen that the second storage device collects content that the first storage device already has. Then, when the content thus accumulated is transferred to the first storage device once more, it may be that the first storage device is inundated with redundant content which then must be deleted. Such unnecessary effort can be avoided by supplying more detailed profile-related information, giving the second storage device information about the content already collected by the first storage device. Therefore, in a particularly preferred embodiment of the invention, the profile-related information of a storage device comprises metadata describing the content already stored by that storage device. The term "metadata" relates to a description of a content, often supplied in the form of a header attached to or associated with the content. For example, metadata for a music file might be a header located at the start of the file, and containing descriptive information such as artist, genre, year of release, etc. The metadata for the content of a first storage device can be copied to a second storage device, along with the description of the autonomous function of the first storage device, as part of the profile-related information. Then, when a first storage device delegates the responsibility for its autonomous function to a second storage device, the second storage device, having received the profile-related information of the first storage device, will be able to determine which content to collect and which content is not to be collected because it is already stored on the first storage device. In this way, the second storage device only collects new content not already stored on the first storage device when the first storage device is removed from the network. Alternatively, the delegated storage device might be able to determine the autonomous function of the delegating storage device simply by examining metadata supplied to it by the delegating storage device. By determining the type of content collected by the delegating storage device, the delegated storage device can also determine the autonomous function of the delegating storage device. For example, examination of the metadata of the delegating storage device might lead the delegating to correctly deduce that the autonomous function of the delegating storage device comprises collecting Abba songs from a certain album, and action movies featuring Jackie Chan.

In a preferred embodiment of the invention, the delegation of responsibility is prepared in advance, i.e. profile-related information is transferred from a first storage device to a second storage device prior to a trigger event, which trigger event causes the second storage device to assume responsibility for the autonomous function of the first storage device. Such a trigger event can be a command from the first, delegating, storage device to the second, delegated, storage device, telling the second storage device that the first storage device is about to leave the network or turn itself of, or it might be simply a missing signal, i.e. a signal that is no longer received by the second storage device as long as the first storage device is not active in the network. The delegated storage device could be asked to periodically check if the delegating storage device is still active in the network, if not, the delegated device can take over with carrying out the autonomous function of the delegating storage device. The trigger event might also occur when the storage device approaches a certain boundary of the network, beyond which it will have left the network. Its approach to this boundary might be detected by one or more other storage devices on the network, or it might signal this event to the other storage devices on the network. However, it may not always be possible or desirable for a portable storage device to actually communicate a command regarding responsibility delegation to a second storage device. For example, it may be that a storage device does not have the time to look for a second storage device to take on its functions directly before being removed from the network, for example in the case of a portable storage device which may be carried by a user on his person, and which is removed from the network when the user suddenly moves out of reach of the network, or the user might drop the portable storage device on the floor, damaging it and thus effectively removing it from the network. Therefore, in a particularly preferred embodiment of the invention, a second storage device automatically assumes responsibility for a first storage device upon occurrence of a trigger event caused when the user in some way removes the first storage device from the network.

The profile-related information can be sent, prior to the trigger event, from the first storage device to the second storage device at intervals, randomly, regularly, or at any suitable rate. Furthermore, the first storage device can send this profile-related information to more than one of the other storage devices in the network, or maybe even to all of them. This might be the case when, for example, the first storage device is not in a position to specifically choose a second storage device to which it can actively delegate responsibility for its autonomous function, and where the other storage devices decide amongst themselves which of them will assume responsibility for the autonomous function of the first storage device.

However, it is advantageous for a storage device to have a certain level of control over which of the other storage devices is delegated the responsibility for its autonomous function. Therefore, in a further preferred embodiment of the invention, a second storage device is chosen by a first storage device on the basis of a reliability value. This reliability value can be, for example, a measure of the suitability of the second storage device for assuming responsibility for the autonomous function of the first storage device, and can be determined on the basis of certain relevant factors such as the storage device's processing power, installed software, hardware, storage and networking capabilities, current work load, whether the storage device has already assumed responsibility for the autonomous function of a further storage device, etc. For example, a storage device without uninterrupted networking capabilities would be unsuitable for collecting up-to-date news bulletins. To be in a position to assume responsibility for such a function from another storage device, a storage device would need a means for connecting to the internet directly or through another device on the network. In another example, a storage device wanting to delegate responsibility for collecting data earmarked as very important to the user would rather choose a second storage device connected to the mains power supply over a storage device only powered by a battery, since the reliability of the storage device connected to the mains is generally higher than that of the battery-operated storage device. Another factor taken into consideration might be that of security, so that a storage device collecting sensitive data would not delegate responsibility for this function to a storage device which is openly connected to an external, insecure, network such as the internet, or which can be accessed by users that should not have access to the sensitive data.

Therefore, reliability values can be assigned to some or all of the storage devices of a distributed storage system. For each storage device to be able to read or access the reliability values of the other storage devices on the network, these reliability values can be stored centrally in a database, or each storage device might be supplied with a list of all the reliability values of the other storage devices on the network. A reliability value might, in its simplest form, be a scalar value such as "1" meaning "very high" or "6", meaning "very low". Alternatively, the reliability value of a storage device might be more informative, for example in the form of a vector of parameters such as available processing power, available storage capacity, etc., which might be updated at regular intervals. A storage device can evaluate the reliability values of the other storage devices on the network shortly before it is due to leave the network, and choose the currently most suitable storage device to which it then delegates responsibility for its autonomous function.

Evidently, a storage device which collects more than one type of content, i.e. carries out more than one autonomous function, can delegate the responsibilities for these different autonomous functions to a number of other storage devices. In this way, for example a storage device which has the autonomous functions "collect action movies" as well as "collect Fleetwood Mac songs" can delegate the responsibility for the first autonomous function, requiring considerable storage capacities and a high bandwidth, to a suitably-equipped storage device, and can delegate responsibility for its second autonomous function to another storage device with less bandwidth and less storage capacity.

Naturally, it would be desirable for the delegating first storage device to re-assume its responsibility once it returns to the network, and to automatically receive any content collected for it in its absence by the second storage device to which it had delegated the responsibility for its autonomous function. Therefore, in a further preferred embodiment of the invention, the content or data accumulated is automatically transferred from the second storage device to the first storage device once a user returns the first storage device to the network. This reinstatement of the first storage device into the network, including the transfer of content from the second to the first storage device, can be entirely automatic, so that the user is not aware of the process. As mentioned above, such an automatic procedure can also be initiated when the user recharges the storage device, changes its batteries, etc. or when the storage device returns from a "sleep" mode. If new content had been collected by the second storage device in the absence of the first storage device, the user's attention may be drawn to this fact by an acoustic or optical signal, depending on how the storage devices are realised or configured, or on the level of feedback desired by the user.

It may not always be advantageous to have a storage device delegate responsibility for its autonomous function to any other storage device, or to a certain specific other storage device. For example, a storage device might be used to collect and manage content of a sensitive nature, and the user may not want this data, any metadata relating to this data, or any details regarding the autonomous function to be available to any other storage device on the distributed storage system. Therefore, in a further preferred embodiment of the invention, a storage device can be prevented, at least temporarily, from delegating the responsibility for its autonomous function to another specific storage device. Some of the other storage devices on the network might be permitted to assume responsibility for its autonomous function, whereas others are not. The delegating storage device can be prevented from delegating responsibility for its autonomous function to the "forbidden" storage devices by means of, for example, a written or spoken command entered by some appropriate user interface to inactivate the responsibility delegation capability of the storage device. In anther scenario, a storage device might be prevented from delegating responsibility for its autonomous function to any other storage device on the network by any suitable means, for example, the delegating storage device might be equipped with a button for this purpose, so that the user need only press this button in order to "lock" the storage device.

Not every storage device in a distributed storage system need be equipped with the means for delegating responsibility for an autonomous function. For example, a home network might comprise mostly fixed storage devices, and only one portable storage device which the user takes with him when he leaves the house. In this case, it can suffice that the portable storage device be equipped with the means for delegating responsibility for its autonomous function, and one or more of the other, stationary, storage devices on the network can be equipped with the necessary means so as to be able to accept this responsibility.

Therefore, a storage device according to the invention can comprise the units and modules as already described, as well as a responsibility assumption unit for assuming the responsibility for the autonomous function of another, delegating, storage device and for causing the data acquisition unit of the delegated storage device to acquire data from the external data source according to a configurable profile describing the autonomous function of the other, delegating, storage device. The delegated storage device can continue to carry out its own autonomous function while at the same time performing the autonomous function of the delegating storage device. However, it is also conceivable that the autonomous function of the delegating storage device is accorded a higher priority than that of the delegated storage device, so that the delegated storage device must neglect its own autonomous function and dedicate its resources to fulfilling that of the delegating storage device. Equally, it might be that the autonomous function of the delegating storage device is considered to be of less importance than that of the delegated storage device, so that the delegated storage device only carries out the autonomous function of the delegating storage device if its resources allow this. The level of priority accorded to the autonomous functions of each storage device can be specified in their profiles, and can be taken into consideration by a storage device when it is looking for a second storage device suitable for assuming responsibility for its autonomous function. Such a priority level can also influence the reliability value, so that, for example, a storage device with sufficient storage and processing capacity, but with an autonomous function with high priority, would still be less preferable (less reliable) to a delegating storage device than an other storage device with less storage and processing capacity, but with an autonomous function with low priority. This other storage device would be prepared to neglect its own autonomous function in order to fulfil that of the delegating storage device.

Evidently, a storage device can be realised so that it is capable of both delegating and assuming responsibility for an autonomous function, so that it can be used for both scenarios. Such a storage device preferably comprises a responsibility delegation unit for delegating the responsibility for the autonomous function of the storage device to another storage device in a network as well as a responsibility assumption unit for assuming the responsibility for the autonomous function of another storage device and for causing the data acquisition unit to acquire data from the external data source according to a configurable profile describing the autonomous function of the other, delegating, storage device.

A distributed storage system according to the invention can comprise any number of storage devices as described above, where at least one storage device, which is preferably portable, can delegate responsibility for its autonomous function to another storage device on the distributed storage system, and at least one storage device can assume responsibility for the autonomous function of the delegating portable storage device. The storage devices can be realised to communicate amongst themselves over a network, where the communication can be carried out using any suitable protocol and any suitable interface, wired or wireless. The units and modules of a storage device required for carrying out its autonomous function, communicating with other storage devices on the network, collecting content, delegating and/or assuming responsibility for an autonomous function, etc., can be realised in the form of suitable software modules loadable onto one or more processing units of the storage device.

Other objects and features of the present invention will become apparent from the following detailed descriptions considered in conjunction with the accompanying drawing. It is to be understood, however, that the drawings are designed solely for the purposes of illustration and not as a definition of the limits of the invention.

DESCRIPTION OF EMBODIMENTS

In the diagrams, like numbers refer to like objects throughout.

Figure 1:
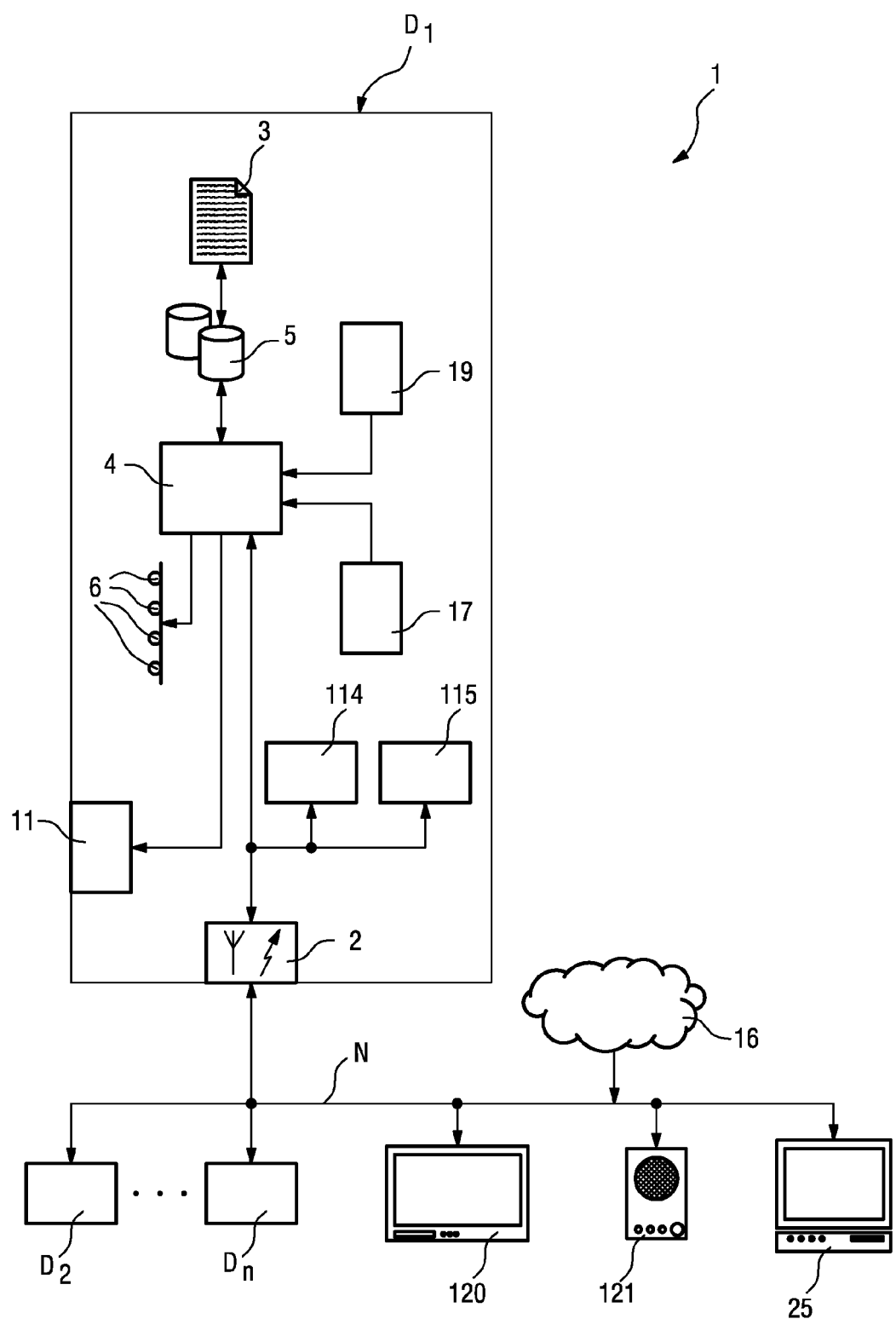
FIG. 1 shows a block diagram of a portable storage device in a distributed storage system according to an embodiment of the invention.

FIG. 1 shows a portable storage device $D_1$ in a network N of storage devices $D_1, D_2, \ldots, D_n$ according to the invention. The portable storage device $D_1$, referred to in the following as "storage bubble", is an autonomous storage container, and the essential blocks of this storage device will be described in detail in the following. For the sake of simplicity, only the blocks of the storage device $D_1$ required for fulfilling the object of the invention will be described in detail, and other blocks, units or modules required for the operation of such a device, such as the power-supply or connectors, are not described in detail, since these will be commonly known to a person skilled in the art.

"Autonomous" means that the storage bubble D1 forms an independent structural unity and can act by itself. The storage device $D_1$ comprises a means for obtaining data or content from an external source 16 such as the internet 16, to which it can connect via the network N, which content satisfies a user-defined configurable profile 3 of the storage device $D_1$. The network N can be realised in a wired or wireless manner, or in a combination of wired and wireless technologies. For example, some of the storage devices $D_1, D_2, \ldots, D_n$ on the network N can communicate using a wireless technology such as Bluetooth, whereas other, perhaps stationary, storage devices $D_1, D_2, \ldots, D_n$ might communicate over cable. Other storage devices $D_2, \ldots, D_n$ in the distributed storage system 1 are shown to the side of the storage device $D_1$, which can also access the source of information 16 external to the distributed storage system 1, such as the internet 16. For rendering the content collected by the storage devices, certain rendering elements such as a television 120 for viewing video content, a hi-fi system 121 for listening to audio content, and a personal computer 25 for managing content are shown to be connected to the network. The storage devices $D_1, D_2, \ldots, D_n$ on the network N in the distributed storage system 1 can all be realised in the same way, or might differ in their realisations, as will be explained below.

The storage bubble $D_1$ comprises a means for autonomously looking for data, also referred to as content, correspond to a user-defined profile 3 of the storage bubble $D_1$. This means for autonomously looking for data and storing these data are, according to the embodiment shown, made possible by means of a processor 4, which comprises a respective software that is executable by the processor 4, communication means 2 connected with the processor 4 and at least one permanent memory 5 connected with the processor 4. Instead of using the suitably programmed processor 4, the storage bubble $D_1$ can be provided with one or more circuits realizing the same functionalities. A dynamic memory can also be provided comprising a memory and a processor integrated into each other. The communication means 2 can be realized e.g. with known means for wireless communication for instance Bluetooth or Wireless Fidelity Connection (WI-FI) or communication according to the NFC standard. Using the communication means 2, the storage bubble $D_1$ can communicate with the other storage bubbles $D_2, \ldots, D_n$ or the other devices 120, 121, 25 over the network N. The storage bubble $D_1$ does not actually need a rendering means for rendering its content, since its content can be rendered on a remote rendering device such as a television 120, a hi-fi system 121, or a personal computer 122. However, in principle, the storage bubble $D_1$ can be equipped with suitable rendering means such as a small display, a loudspeaker, etc.

A user can define or configure a profile 3 for the storage bubble $D_1$ being for instance: "This bubble will be used to collect popular music only." This profile 3 provides the storage bubble $D_1$ with information about the content to be gathered. The profile 3 is, according to the embodiment shown, stored in the permanent memory 5 of the storage bubble $D_1$ and can be defined at different levels of granularity.

The profile 3 can for instance only contain information about the type of content that shall be stored in the permanent memory 5 of the storage bubble $D_1$, e.g. audio, video, digital pictures and text or other types of data. For each content type specified in the profile 3, a bandwidth can be defined by providing a target bit rate or target communication technology, e.g. Bluetooth, for the specified content type. This bandwidth specifies the amount of network bandwidth that can be used by the storage device to autonomously collect content of a certain type.

Furthermore, the user can provide more specific information about the chosen content when setting up the profile 3. Setting up the profile 3 for video content can be based on a selection of one or more genres or moods (romantic, funny, etc.). Setting up the profile 3 for videos can be further based on, for example, keywords in the title, author information and spoken words in the content or video sequences.

For audio data, configuration of the profile 3 can be based on a selection of one or more genres or moods. Setting up the profile 3 for audio content can also be based on keywords in a title, artist information and spoken/sung words in the content. An audio profile could be based on "humming" or other acoustic information, i.e. the user hums what the collected audio content should sound like. In the last case, the storage device $D_1$ can comprise means for the input of voice, such as a microphone, not shown in the diagram.

For text content, configuration of the profile 3 can be based on keywords in the content to be collected.

For data of any type, configuration of the profile 3 can specify a file name and file extension, or multiple file names and file extensions.

Also, the profile 3 may specify a set of different content types such as "collect holiday pictures and holiday videos and 2005 summer hits"

Figure 5:
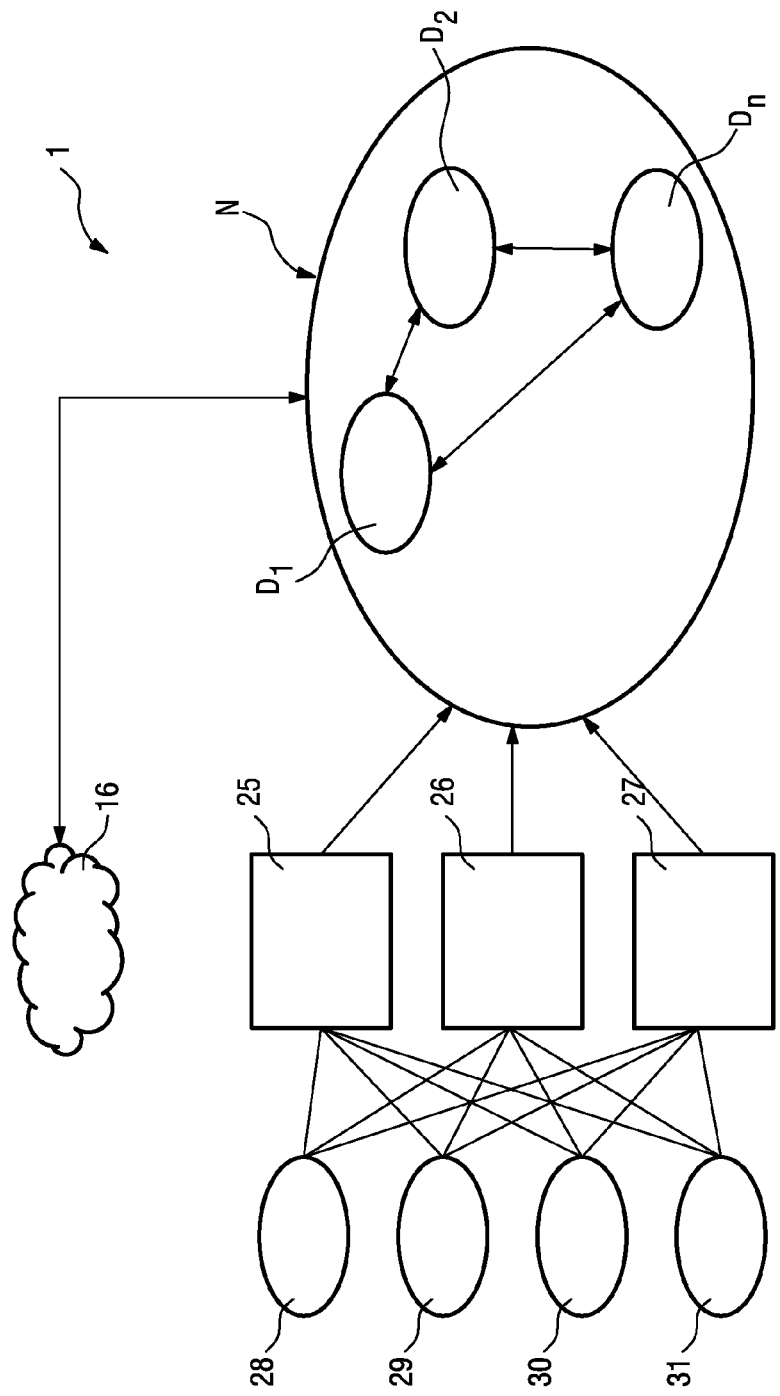
FIG. 5 shows a self organizing distributed storage system according to an embodiment of the invention.

Furthermore, it is possible that the profile 3 specifies information about how to deal with content created at a certain date. Thus it is possible to discriminate on file creation or modification date. This allows a number of storage bubbles $D_1, D_2, \ldots, D_n$ on a network N, as shown in FIG. 5 and described in detail below, can organize the available content based on time, resulting in an automatic archival system. Of course, profiling based on content as well as creation/modification date can be combined. In this way, a profile 3 can be created such that the storage bubble $D_1$ will store, for example, only the most up-to-date news.

The storage bubble $D_1$ also comprises an input device, not shown in FIG. 1, for the input of the profile 3, e.g. a touch screen with menu navigation. Furthermore, the profile 3 can, for instance, be entered via an external computer 122 connected to the storage bubble $D_1$ via a wireless or wired interface 2. In this case a user interface of the storage bubble $D_1$ for entering the profile 3 can be transferred to the computer and rendered on a display of the computer 122.

To make setting of the profile 3 easier, a user can, according to an embodiment of the invention, choose his preferred content types from a list of predefined contents and data formats, e.g. by activating the desired contents and formats via mouse click. However, it can also be provided that several pre-defined profiles are available. Thus a user can choose one of several preset profiles for the storage bubble $D_1$.

In addition, the profile 3 could be set by giving one or more content items. For example, the user may select several photos, e.g. beach photos, and then tell the storage bubble $D_1$ to generate a profile 3 based on these photos. After this the storage bubble $D_1$ will look for other beach photos stored on other devices as well. This provides the advantage that the user does not have to specify a detailed profile 3, he only has to provide examples of the content that he wants to be stored on the storage bubble $D_1$.

An important concept used within the preferred organization of data in the present context are content metadata. These metadata provide information about content such as title of content, video/program or music genre, positions of events in the content, such as football goal events, content mood, low-level content features (average luminance, amount of motion in video content, audio features, etc.), content signatures (humming signature for instance), information of how content is encoded, bit rate information, objects in an image, etc.

The metadata of content are used to decide, based on the storage profile 3, if the content stored on an other device $D_2, \ldots, D_n$ or located in an external source such as the internet 16 is of interest to the storage bubble $D_1$, and if and how the content should be processed. Metadata of content could be already available from a stationary storage device however this should not be expected by default. In order to keep the storage bubble $D_1$ independent from the functionality of other devices the storage bubble $D_1$ can comprise means for analysing data on its own. This analysing means can for instance be realized with a software installed on the processor 4 of the storage bubble $D_1$. This analysis software can be realized by means of a software as, for instance, commonly used for speech pattern recognition. The analysed data can for instance be searched for specific keywords. According to the result of the analysing process, metadata containing information about the analysed content can be created. This metadata can provide the information described above. The metadata of analysed content are preferably stored in the storage bubble $D_1$.

Whether or not a content, or to be more exact the data containing this content, corresponds to the profile 3 of the storage bubble $D_1$, can be determined by comparing the profile 3 with the metadata of the content.

Figure 4:
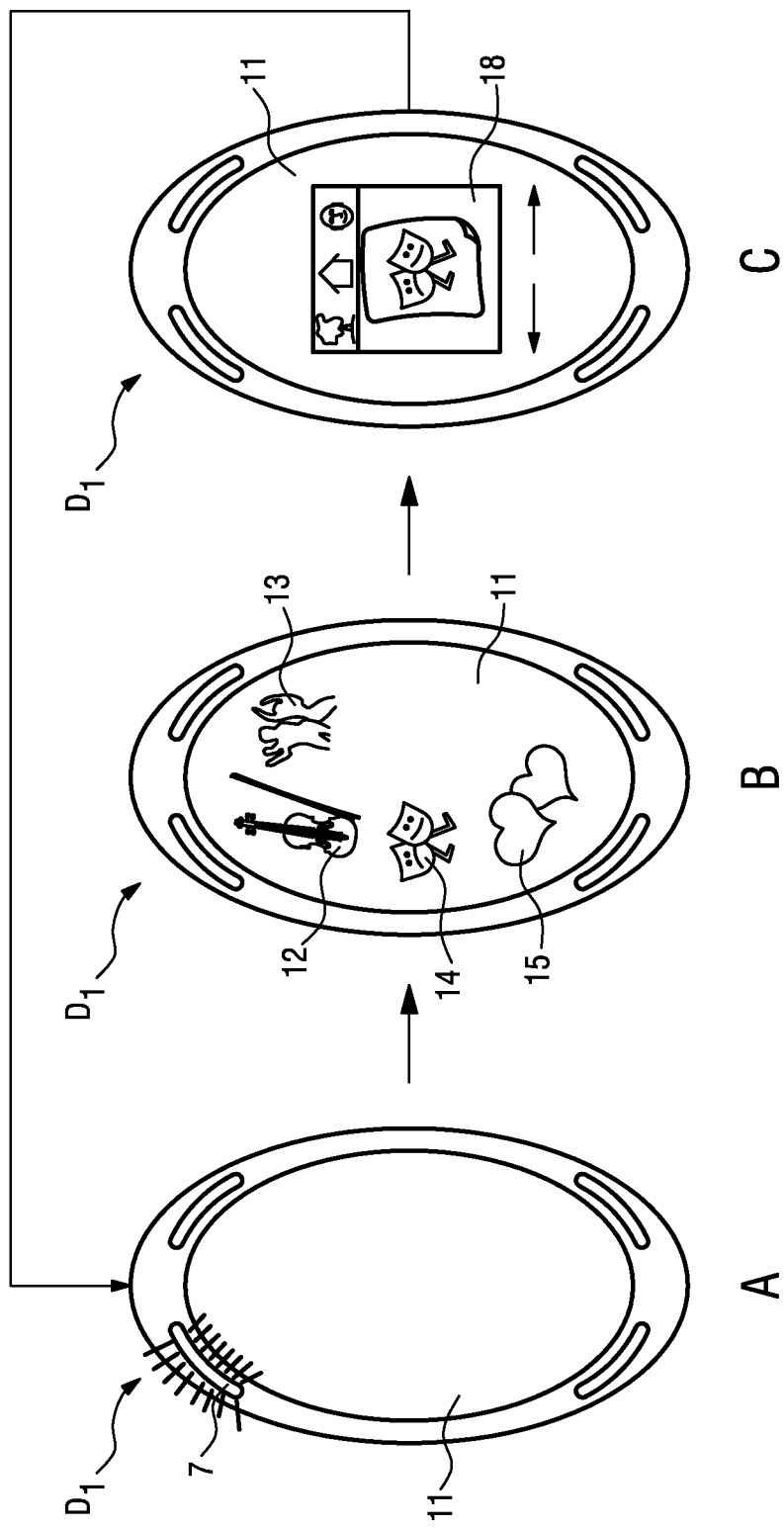
FIG. 4 shows a number of stages in a content retrieval procedure carried out by a portable storage device according to an embodiment of the invention.

According to an embodiment of the invention, the storage profile 3 of the storage bubble $D_1$ can also contain information about the desired storage bubble behaviour concerning, for instance, when to delete or move what content and what part of the content profile 3 has higher priority than another part of the content profile 3. When almost all the storage capacity of the storage bubble $D_1$ is used up, the storage bubble $D_1$ can make a decision as to how to react. Thus, the storage bubble $D_1$ can request another storage bubble $D_2, \ldots, D_n$ of the network N of storage bubbles $D_1, D_2, \ldots D_n$ as shown in FIG. 4 to accept content that fits the content profile 3 to a lesser degree than other content stored on the requesting storage bubble $D_1$. In this way, some content defined by the profile 3 can be accorded a higher priority than other content. This priority can be defined by the user in the storage profile 3 when configuring the profile 3 of the storage bubble $D_1$.

Furthermore, it can be defined in the profile 3 what to do when the storage bubble $D_1$ is full and no other storage bubble $D_2, \ldots, D_n$ accepts content. In this case the storage bubble $D_1$ can, according to the settings of the user profile 3, delete content directly, cease gathering content, or delete content after a predetermined time and then commence gathering content. All these features of the storage bubble $D_1$ are provided by the aid of the communication means 2, the memory 5 and the processor 4 mentioned above.

In addition, the processor 4 of a storage bubble $D_1, D_2, \ldots, D_n$ can comprise software for monitoring available memory space. If the stored content in memory 5 exceeds a certain threshold, the processor 4 can transfer content and corresponding metadata to another storage bubble $D_1, D_2, \ldots, D_n$ on the network N.

If a first storage bubble $D_1$ requests the transfer of content to a second storage bubble $D_2$ because the first storage bubble $D_1$ is full, there is provided an acceptance policy of the second storage bubble $D_2$ can determine whether it accepts content, for instance based on the level of profile fitness of the content, the storage capacity available and a minimum reserve storage capacity of the second storage bubble $D_2$.

The content from stationary storage devices or other storage bubbles $D_1, D_2, \ldots, D_n$ copied or moved to another storage bubble $D_1, D_2, \ldots, D_n$ can be downscaled versions or otherwise processed versions of the original content. For instance, to watch a video on a Personal Digital Assistant while travelling could require a low bit rate or low resolution version of the original video. Said downscaling and processing can be carried out for instance by means of a suitable programming of the processor 4 of a storage device $D_1, D_2, \ldots, D_n$.

In principle, content processing functions that are frequently needed, such as transcoding, are realized in the storage bubble $D_1$ itself, as mentioned above, to keep it as autonomous as possible.

But according to another embodiment of the invention it is also possible that a stationary storage device $D_1, D_2, \ldots, D_n$ or any other device 122 processes the content of interest for the interested storage bubble $D_1, D_2, \ldots, D_n$ as a service. For instance, a Hard Disc Drive recorder usually has an encoder/decoder functionality. This functionality can be used to transcode a requested video stream to the requested format. Transcoding and other processing functionalities are, according to a preferred embodiment of the invention, offered through standardized interfaces and service discovery, for instance using Universal Plug and Play (UPnP).

A storage bubble $D_1, D_2, \ldots, D_n$ further comprises a means for content indication. This means can be realised by an appropriate illumination means 6 such as a bank of LEDs 6, shown in the block diagram of storage device $D_1$, which light up an area on the outside of the storage bubble $D_1$ in different colours according to the content stored, and which are described in more detail below.

In order to prolong battery life, the embodiment of the storage bubble $D_1$ can be equipped with one or both of a motion sensor 19 or a pick-up sensor 17. The motion sensor 19 can for instance be realized by means of a motion detection connected to the processor 4 which controls the illumination means, e.g. the LEDs 6. The pick-up sensor 17 can for instance be realized by means of a contact sensor activated when the user takes the storage device $D_1$ into his hand. When the storage device $D_1$ is put down and not moved for a while, it can automatically enter a kind of stand-by mode.

Figure 2:
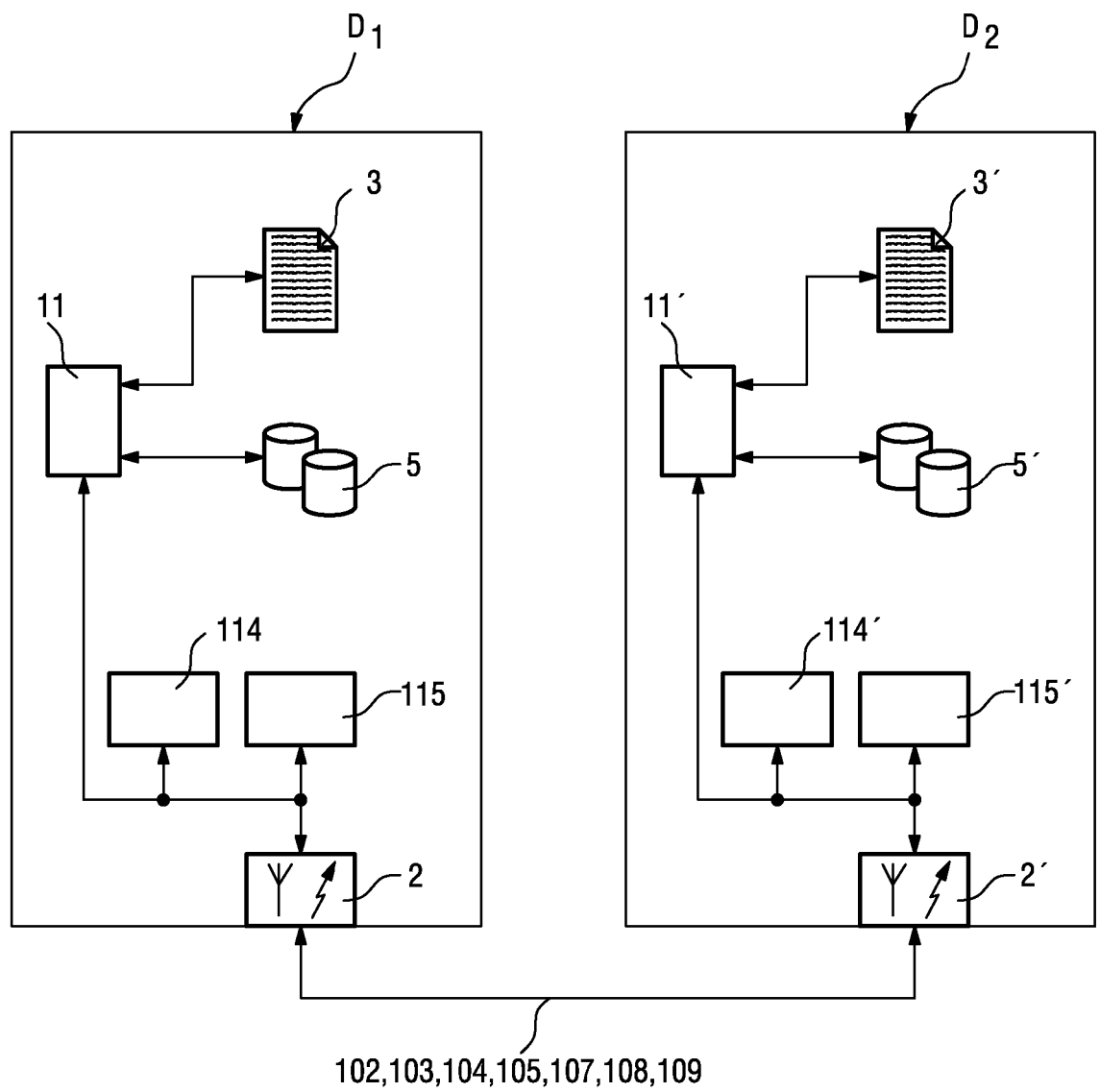
FIG. 2 shows a block diagram of two storage devices in a distributed storage system according to an embodiment of the invention.

The portable storage device $D_1$ can be removed from the network N at any time. To ensure that the autonomous function of the storage device $D_1$ is carried out in its absence, the storage device $D_1$ delegates responsibility for its autonomous function before leaving the network N. FIG. 2 shows two storage devices $D_1, D_2$ of the distributed storage system 1, containing the functional blocks already described under FIG. 1 above, and other functional blocks which will now be described in detail. For the sake of clarity, the network N and other elements on the distributed storage system 1, such as other storage devices and rendering devices, are not shown, but are assumed to be there as described in FIG. 1 above.

Each of the storage devices $D_1, D_2$ is capable of searching for and storing content according to their respective configurable profiles 3, 3'. In this case, the profile 3 of storage device $D_1$ is configured so that storage device $D_1$ collects rock music, whereas the profile 3' of storage device $D_2$ is configured so that storage device $D_2$ collects up-to-date news bulletins. Before leaving the network N, the storage device $D_1$ can transfer profile-related information 104 concerning its configurable profile 3 and/or metadata about the content, in this case a collection of rock music, stored on that storage device $D_1$ to any other storage device on the network N. These other storage devices save this profile-related information in their memory units. Furthermore, the storage device $D_1$, in deciding which of the other storage devices $D_2, \ldots, D_n$ on the network N is most suitable for the task of carrying out the autonomous function of collecting rock music, requests reliability values from the other storage devices $D_2, \ldots, D_n$. In this case, a reliability value 108 of the storage device $D_2$ indicates that the storage device $D_2$ is most suitable for accepting responsibility for the autonomous function of the storage device $D_1$. Therefore, a responsibility delegation unit 114 of the storage device $D_1$ decides that storage device $D_2$ is the most suitable storage device for carrying out the autonomous function, and sends an appropriate command 109 to the storage device $D_2$, where it is received by a responsibility assumption unit 115'. The responsibility assumption unit 115' of the delegated storage device $D_2$ can acknowledge assumption of the autonomous function of the storage device $D_1$, or it can simply proceed to inform its processor and data acquisition unit 4' that storage device $D_2$ is now responsible of collecting content according to the profile related information 104 previously received and stored on behalf of the storage device $D_1$.

Occurrence of a trigger event, arising when storage device $D_1$ is leaving or has left the network, causes storage device $D_2$ to commence carrying out the autonomous function of storage device $D_1$. The trigger event can be a dedicated signal 107 from the first, delegating, storage device $D_1$ to the second, delegated, storage device $D_2$, informing the second storage device $D_2$ that the first storage device is about to leave the network N, or this trigger event might arise when a signal 107 otherwise continually or intermittently transmitted by the first storage device $D_1$ during its presence in the network N is no longer received by the second storage device $D_2$, or might arise if the storage device $D_1$ is physically disconnected (by pulling a plug, for example) from the network N. The trigger signal 107 might also be generated when the first storage device $D_1$ approaches the network boundary, and may be generated by the first storage device $D_1$ itself, or by another storage device $D_2, \ldots, D_n$ which notices that the first storage device $D_1$ is approaching the limits of the network N.

All the information pertaining to the autonomous function of storage device $D_1$ required by storage device $D_2$ is contained in the profile-related information 104, saved in a memory unit 5'. Therefore, using its data acquisition unit 4' and its communication interface 2' for connecting to an external source of data via the network N, it can proceed to collect rock music for storage device $D_1$, and stores any collected content in its memory unit 5'. Parallel to this, the delegated storage device $D_2$ can also continue to carry out its own autonomous function, i.e. to collect news bulletins, or a priority level of the profile 3 corresponding to the autonomous function of the delegating storage device $D_1$ might cause the delegated storage device $D_2$ to interrupt carrying out its own autonomous function, and to dedicate its resources to carrying out the autonomous function of the delegating storage device $D_1$, resuming in full its own autonomous function when the delegating storage device $D_1$ has returned to the network N. The delegated storage device $D_2$ need not necessarily entirely cease carrying out its own autonomous function until the delegating $D_1$ storage device returns to the network N. Only when its available resources are completely taken up with the autonomous function of the delegating storage device $D_1$, will the delegated storage device $D_2$ have to take a break from carrying out its own autonomous function.

Once the delegating storage device $D_1$ returns to the network N, it proceeds to make its presence known, for example by transmitting a notification of return signal 103 to the delegated storage device $D_2$ or to all storage devices $D_1, D_2, \ldots, D_n$ on the network N. Once the delegated storage device $D_2$ receives this signal 103, the responsibility assumption unit 115' initiates the transfer of any content 102 and metadata 105, collected according to the autonomous function of storage device $D_1$ in its absence, by means of the communication interface 2' to the storage device $D_1$, where it is received by the communication interface 2 and then stored, after any suitable processing by the data acquisition unit 4, in the memory 5. In this way, the storage device $D_1$ avails of all the content 102 and metadata 105 that was gathered during its absence from the network N, and the entire procedure, running automatically in the background, was essentially invisible to any users of the storage devices $D_1, D_2$.

In the diagram, a single signal is shown between the interface 2 of the storage device $D_1$ and the interface 2' of the storage device $D_2$, to represent the content 102, notification of return signal 103, the profile-related information 104, metadata 105, trigger event signal 107, reliability value 108, and responsibility delegation command 109, but it is to be understood that these signals are independent of each other. Transmission of these signals 102, 103, 104, 105, 107, 108, 109 would typically be in a wireless manner, but could conceivably be transmitted via a cable connection. The storage devices $D_1, D_2, \ldots, D_n$ of the distributed storage system 1 might use the network N to communicate these signals 102, 103, 104, 105, 107, 108, 109, or they might avail of any other suitable communication interface.

In FIG. 2, the first and second storage devices $D_1, D_2$ are shown to each have a responsibility delegation unit 114, 114' and a responsibility assumption unit 115, 115'. This implies that both storage devices $D_1, D_2$ can delegate responsibility for their own autonomous functions, and are also able to assume responsibility for the autonomous function of another storage device. Another possible configuration would be for a storage device, not shown in the diagram, to have only a responsibility delegation unit but no responsibility assumption unit. This might be favourable for a type of storage device needed to continually collect important data, which process is not to be interrupted by the responsibility delegation of another storage device. Yet another possible configuration would be for a storage device, also not shown in the diagram, to have only a responsibility assumption unit but no responsibility delegation unit. This might be favourable for a type of storage device, maybe stationary, with large processing and storage capabilities and with a high reliability value, which can be delegated by one or more other storage devices to reliably carry out their autonomous functions. The responsibility delegation unit and responsibility assumption units shown as blocks in the diagram might actually comprise software modules, so that a storage device can be equipped with the means of delegating or assuming responsibility simply be downloading or installing the necessary software modules. Furthermore, a storage device which has been delegated to carry out the autonomous function of another storage device can, in turn, delegate this responsibility to a further storage device, if, for some reason, the delegated storage device cannot proceed to carry out the autonomous function.

Figure 3:
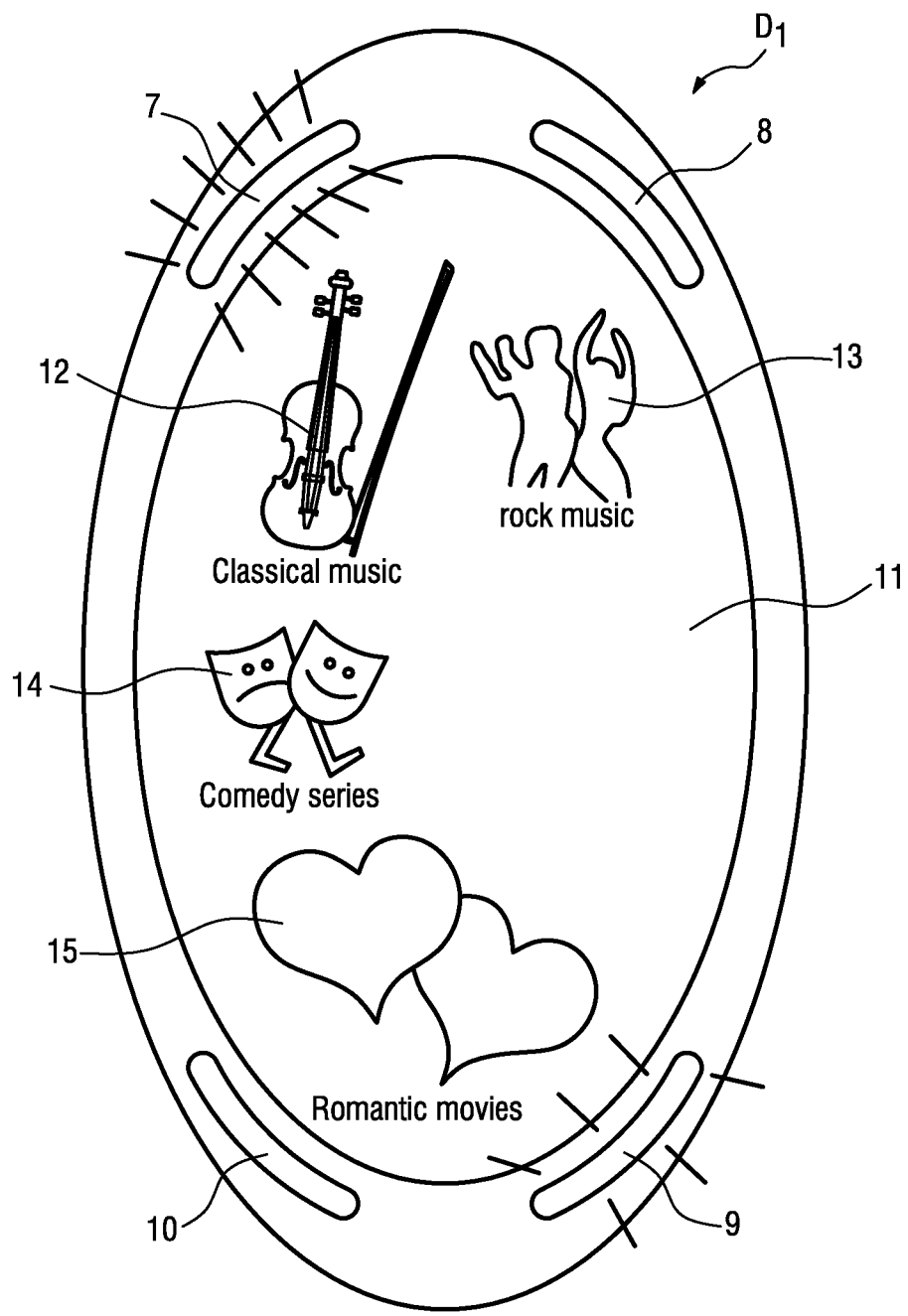
FIG. 3 shows a realisation of a portable storage device according to an embodiment of the invention.

For the user to be easily able to see what content is stored on a storage device, the exterior of the storage bubble $D_1$ is divided into a number of regions 7, 8, 9, 10, as shown in FIG. 3. In this case, the exterior of the storage device $D_1$ has four regions, representing different types of content, e.g. audio, video, images and text (e.g. Word, pdf) or data (e.g. Excel) or indicating semantics, for instance, "beach" images, "family" photos, "scuba-diving" images and images of a newborn child. Every section 7, 8, 9, 10 has its own colour generated by LEDs, as mentioned above, or another means of illumination. The amount of data or content of a certain kind stored in the storage bubble can be shown in a rudimentary way by the intensity of the assigned colour. For instance, the brighter the colour allocated to a certain content, the more of that kind of content is stored on the storage bubble $D_1$. The external appearance of the storage bubble $D_1$ is this influenced by the amount of content stored in the storage bubble $D_1$. For instance, if the storage bubble $D_1$ changes into red it indicates that it mostly contains audio, or if the device turns into green it indicates that mainly action movies are stored on it. In this way, a rapid identification of the content available on a set of portable storage devices is made very easy for the user.

When a storage bubble is selected based on this rudimentary information about the content, more detailed indication methods can provide further information about the content to the user, e.g. by means of a display 11 on which the user can browse through the content stored on the storage bubble $D_1$.

For instance the display 11 of the storage bubble $D_1$ can show multiple icons 12, 13, 14, 15 of different sizes, where an icon indicates the type of content stored, and the size of the icon 12, 13, 14, 15 indicates how much of that content type is stored.

According to another embodiment of the invention, E-ink displays can be used. This means that the icons 12, 13, 14, 15 on the display 11 remain visible for a few days even if the display is not powered in that time. This might do away with the need for LED lights for indication. The display could actually be a "skin" of a storage device $D_1, D_2, \ldots, D_n$; the skin being visible from all sides of the storage device $D_1, D_2, \ldots, D_n$ making it more easy to visually select one of a number of storage bubbles $D_1, D_2, \ldots, D_n$ from different perspectives.

To make it possible to compare the amount of content of different type, e.g. audio and video, the icon size can be related to the number of streams or files stored on the device rather than the storage size. Using, for instance, a touch screen interface and touching an icon 12, 13, 14, 15 will show a list or summaries of the content represented by the icon.

It is possible to realize just one of the above mentioned indication methods (display, colour) or a combination of these indication methods in the storage bubble $D_1$. Furthermore, the visual indication methods may only be activated when the user picks up a storage device or approaches the storage device, as explained under FIG. 1 above.

Summarizing the indication methods, it can be said that the colour (illumination) indication is the most rudimentary and provides a first source of information to the user. When picking up the storage device D1 the user can switch on the display 11, if one is provided, and see what is stored in the storage device D1 in more detail by looking at the icons 12, 13, 14, 15. If, based on the icons shown, the content type of interest is available, the user can browse further by selecting the icon 12, 13, 14, 15 of interest.

The highlighted area 7 in FIG. 3, e.g. in the colour red in the upper left corner shows that a lot of video is stored on this device. The illuminated area 9 in the lower right corner, e.g. in the colour yellow indicating the presence of audio, is not as bright as the red area 7. The colours in areas 8, 10 indicating the presence of digital pictures are completely dimmed. From the appearances and relative sizes of the icons 12, 13, 14, 15, it is easy for the user to see that the content stored is mostly romantic movies.

Specific content can for instance be represented on the display 11 in the following ways:

Video streams can be summarized by showing a video manga (a video manga is a video summary in the form of a Japanese comic book), a sequence of key frames, a trailer showing some key scenes or a DVD or VHS box cover. Also a simple list with the title and playing actors can be given.

For digital pictures, thumbnail versions can be shown or an automatically generated photo collage of a set of pictures can be shown.

For music, playing the chorus in case of a popular song, showing the CD cover with song title, showing a transcript of the speech in the audio, could represent audio streams or showing text parts of a text document.

In all cases also a simple directory tree showing file name and other attributes could be shown.

FIG. 4 shows an example of some stages in a retrieval procedure, where the user wishes to retrieve some of the content from a storage device $D_1$. The content retrieval starts with the user's selection of the storage bubble $D_1$ from a number of storage bubbles $D_1, D_2, \ldots, D_n$, based on its rudimentary representation via colour intensity of stored content indicated as step A in FIG. 4. In this example, the storage bubble $D_1$ contains videos (colour of region 7 is red and brightest, representing video). In step B the display 11 is activated, and more detail regarding the type of content is indicated by means of icons 12, 13, 14, 15 with different sizes. If a user wants to retrieve a comedy series, he can select the "comedy series" icon 14.

If the content type of interest is available, the content of that type can be browsed using summarized representations in step C. In this example, the user browses through a comedy series, represented by the respective video cover 18 or manga.

Because different media, such as audio, video and pictures need different storage capacities and have different content analysis needs, multiple kinds of storage bubbles can be defined. Different storage bubble types can be sold as active counter parts of passive storage media. This will certainly be possible looking at the decreasing trend of processing, storage and networking technology costs. Storage bubble models with the following storage capacities and functionality could be differentiated for instance:

A storage bubble $D_1$ with the storage capacity of a typical memory stick or other solid state memory card, e.g. 512 MB, with text and spread sheet analysis capabilities and simple text and spread sheet browsing capabilities or image content analysis capabilities and image thumbnail rendering capabilities;

a storage bubble $D_1$ with the storage capacity of a normal CD with audio or content analysis capabilities and simple audio rendering capabilities;

a storage bubble $D_1$ with the storage capacity of a DVD with video content analysis capabilities and simple video summarization capabilities using thumbnail key frames or a thumbnail video manga compilation;

a storage bubble $D_1$ with the storage capacity of a BluRay Disc with video content analysis capabilities and simple video summarization capabilities using thumbnail key frames or a thumbnail video manga compilation or a generic storage bubble $D_1$ with a storage capacity of a large HDD, e.g. 300 GB, and a large variety of content analysis capabilities.

What wireless networking capabilities are present could also be differentiated although this will limit the communication only to devices that have the same communication and networking capabilities.

Using for instance a Wireless Fidelity Connection (WI-FI connection) for the network N, the storage bubble $D_1$ can also directly access an Internet service via a broadband connection, e.g. ADSL, as illustrated in the embodiment shown in FIG. 1. As a service it is, according to an embodiment of the invention, possible to download different content analysis functionalities for a fee from a server via the Internet such that the storage bubble $D_1$ can change its "expertise" from, for instance, audio to digital pictures. The service lists all the content analysis possibilities for each storage bubble model.

Furthermore, the Internet service provides, according to a further embodiment of the invention, content that fits in the profile 3 of the storage bubble $D_1$. The content of interest can be bought directly from the Internet service. A user can for instance set in the profile 3 of the storage bubble $D_1$ the maximum amount of money or "credits" that the storage bubble $D_1$ can spend. The user can give, when subscribing to the online service, all information to make an automatic purchase possible, e.g. credit card information.

To give a user more control over purchase the user can get a message, e.g. an SMS, MMS or e-mail, with a link to a site enabling a user to cancel or approve the order put by a storage bubble $D_1$. The message mentioned above can, according to an embodiment of the invention, be transmitted to the storage bubble $D_1$ and be displayed on the storage bubble $D_1$ too.

Although the focus here is on portable storage bubbles 1 the method described above can be applied to network storage devices in general.

FIG. 5 shows a self-organizing distributed storage system 1, according to an embodiment of the invention, for the storage of data. The system comprises a network N of portable storage bubbles $D_1, D_2, \ldots, D_n$ of the type of the portable storage bubble $D_1$ described above, and other storage devices such as for instance a personal computer or home media server 25, a hard-disk drive (HDD) 26, and a digital video disc (DVD) or so-called "BluRay" recorder 27. Content of interest for a storage bubble $D_1, D_2, \ldots, D_n$ not available on any of the storage bubbles $D_1, D_2, \ldots, D_n$ can be retrieved from these devices 25, 26, 27. Content can also be available from an external network 16, e.g. the Internet 16, or from any other suitable external source such as analog audio/video broadcasts 28, digital video broadcasts 29, digital home video/picture/audio content 30, or non-broadcast published content 31 (audio, CD, DVD, etc.).

Self organization of the content stored in the distributed storage system 1 can be achieved very easily since the storage bubbles $D_1, D_2, \ldots, D_n$ are arranged to exchange content and other data, e.g. metadata, with one another, using wireless networking technology, for instance WI-FI and Bluetooth, such that the profiles of all the bubbles $D_1, D_2, \ldots, D_n$ are satisfied as much as possible.

The protocol and interface for content and metadata exchange and processing can for instance be an industry standard protocol and interface, e.g. MPEG-21, UPnP, or any proprietary protocol and interface.

Although digital home video/audio/pictures can be seen as an external source, devices such as digital video cameras and audio recorders having networking capabilities can directly be accessed by a storage $D_1, D_2, \ldots, D_n$. In general, any device with wireless network capabilities that implements a protocol and interface for content and Metadata exchange and processing can directly be accessed by a storage bubble, as will be shown with the aid of FIG. 6 below.

Figure 6:
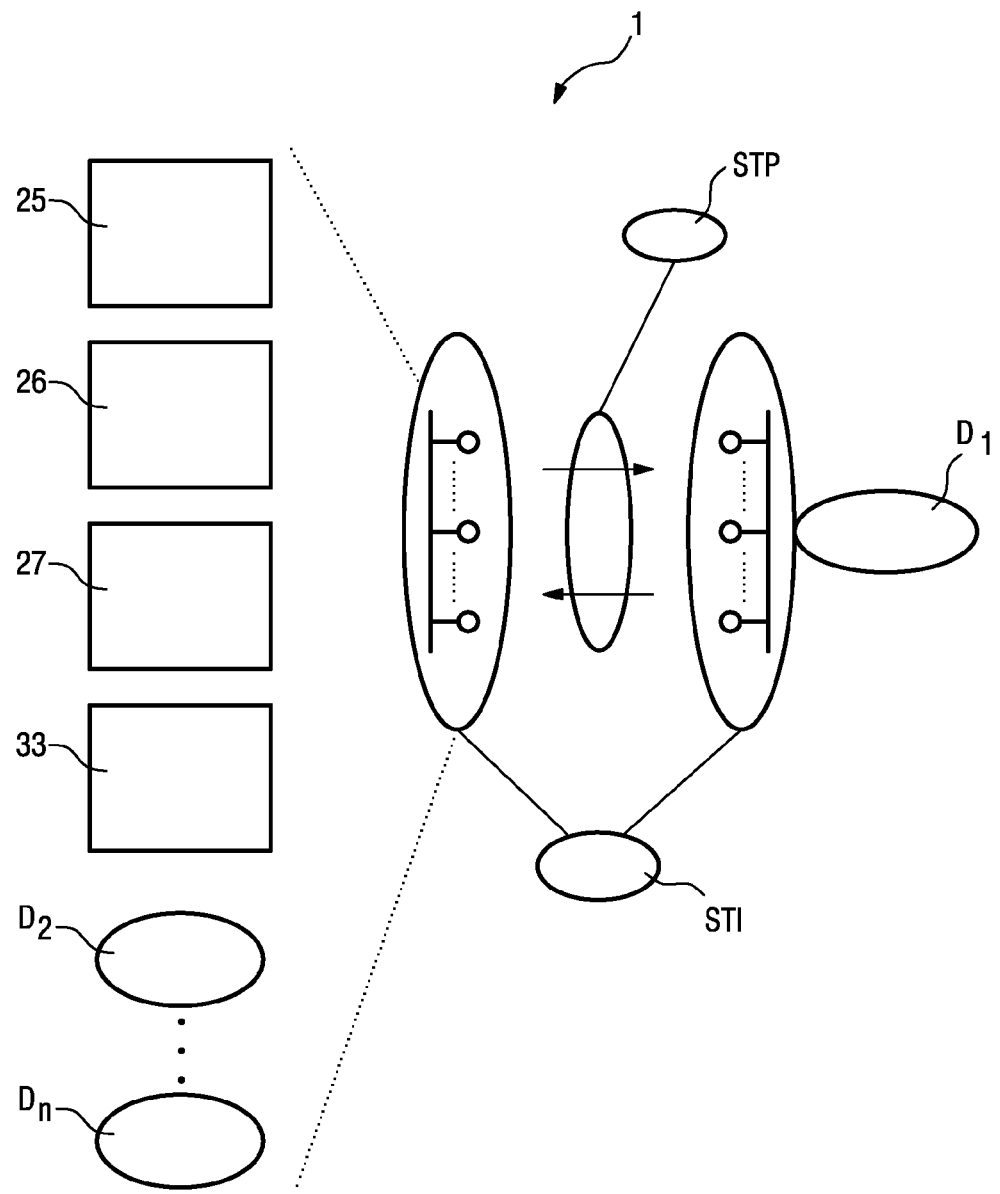
FIG. 6 shows interfacing between system parts in a distributed storage system according to an embodiment of the invention.

According to FIG. 6, storage bubbles $D_1, D_2$ in general communicate and exchange information by a standardized protocol STP and standardized interface STI. In general, storage bubbles $D_1, D_2, \ldots, D_n$ may not always have means to directly get content from input sources such as analog cable TV/radio or a DVD. To get content not already available on the storage bubble network N, they can communicate, using for instance a WI-FI connection, with other devices such as a personal computer 25 or home media server 25, BluRay recorder 26, digital video camera 33 etc., availing of these means. In order to do this with a large number of devices from different vendors, the interfaces and protocols utilised are preferably standard.

Although a storage bubble could in principle get content directly from input sources, this is not the main intention of storage bubbles. Although storage bubbles can have different forms and implementations, they are generic storage devices independent of any form of content type and specific means of retrieving information, such as a tuner for analogue digital video broadcasts or a DVD. Furthermore, the costs of a storage bubble as a consumer electronics product should be so low that consumers are willing to buy a number of storage bubbles enabling the concept of self organization of content. Nevertheless, a storage bubble can comprise rendering capabilities.

The more storage bubbles $D_1, D_2, \ldots, D_n$ there are available in the distributed storage system 1, the more fine-grained the content can be semantically segmented over multiple storage bubbles, the easier it gets to physically retrieve specific content by selecting a specific bubble, the bigger the total storage capacity of the bubble network, the more content redundancy can be created, the easier it is for users to consume the same content at possibly multiple locations that are not connected through a communication network.

Furthermore, the distributed storage system 1 is arranged to search for data stored on the storage devices 25, 26, 27, 33 that match with user set profiles of the storage bubbles $D_1$, $D_2, \ldots, D_n$ and to store data matching with the storage profile of a storage $D_1, D_2, \ldots, D_n$ in this bubble.

For instance, one storage bubble $D_1$ has the profile to collect songs of a certain kind in a low bit rate format (for example because the storage bubble $D_1$ only has low bit-rate Bluetooth communication capabilities so that it tries to minimize the required transfer time of content over its wireless Bluetooth link) and it will communicate with other storage bubbles $D_2, \ldots, D_n$ of the same or other type and request popular songs in a low bit rate format. A storage bubble $D_2$ that has some popular songs could for instance, indicate that the popular songs can be moved to the storage bubble $D_1$ instead of copied because the popular songs do not really fit in its own profile, and better fit with the other storage bubble's profile.

The self organization of the distributed storage system 1 results in a physical separation of content on the different storage bubbles $D_1, D_2, \ldots, D_n$. A user can physically grab the content he or she is interested in because of the storage bubble's means of showing what content is stored on a storage bubble $D_1, D_2, \ldots, D_n$. In this way the storage bubbles $D_1$, $D_2, \ldots, D_n$ organize the available content such that each storage bubble $D_1, D_2, \ldots D_n$ complies with its profile as well as possible. This mechanism enables users to physically get content they are interested in by selecting a storage bubble. Thus the distributed storage system 1 comprising storage bubbles $D_1, D_2, \ldots, D_n$ represents a distributed storage home network, instead of a centralized or less-distributed network.

By physically organizing content over the portable storage bubbles $D_1, D_2, \ldots, D_n$ described above, it is not hard to envision a consumer's home filled with storage bubbles $D_1$, $D_2, \ldots, D_n$ of this kind in drawers, under the bed, close to some rendering devices etc. If, for instance, a user likes to watch action movies he/she could look in the drawer for a green-lit storage bubble, when green corresponds to the genre "action movies". When the user found such a bubble he/she could, for instance, put it close to a TV equipped with means for communicating with the storage bubble, e.g. WI-FI, and play one of the action movies stored on the bubble. Alternatively, for example, the user could instruct the storage bubble to stream the content to the TV of choice.

In general there are three sources of content for a storage bubble $D_1, D_2, \ldots, D_n$: other storage bubbles $D_1, D_2, \ldots, D_n$, stationary storage devices 25, 26, 27, 33 or an external network such as the Internet 16. For all content stored on storage bubbles $D_1, D_2, \ldots, D_n$, metadata will be available that are needed by another storage bubble $D_1, D_2, \ldots, D_n$ to decide whether the content is of interest. On the other hand, for stationary storage devices and other common devices 25, 26, 27, 33, the availability of the metadata of interest or even any metadata can not be assumed.

Assuming that a stationary or other device 25, 26, 27, 33 provides UPnP like services, such as providing lists of available content and of what type the content is, e.g. pictures, audio, video or any other type of data, a storage bubble $D_1$, $D_2, \ldots, D_n$ can download and analyse the content stored on these devices 25, 26, 27, 33. Based on this analysis a storage bubble $D_1, D_2, \ldots, D_n$ can decide by comparing the analysed content with its profile what content to copy to its own storage space. Content analysis of content from a stationary or other storage device has to be performed only if no other storage bubble $D_1, D_2, \ldots, D_n$ has analysed that content before to obtain the same metadata. To ascertain whether a content in question is already analysed a storage bubble $D_1, D_2, \ldots, D_n$ can send a request for the metadata in question to the other storage bubbles $D_1, D_2, \ldots, D_n$ in the network N.

A storage bubble $D_1, D_2, \ldots D_n$ will start analysing external content only if the request to other storage bubbles $D_1$, $D_2, \ldots, D_n$ for metadata did not succeed. A storage bubble $D_1$, $D_2, \ldots, D_n$ can store metadata of any content analysed by that storage bubble, even if the content was not copied to the storage bubble, because it did not fit the profile of the storage device $D_1, D_2, \ldots D_n$.

Because the amount of content to be analysed can be large, a storage bubble $D_1, D_2, \ldots, D_n$ can request other storage bubbles to help to search for content that fits the profile of the storage bubble $D_1, D_2, \ldots, D_n$ requesting the help. Storage bubbles $D_1, D_2 \ldots, D_n$ that honour that request for help get assigned a part of the content list to analyses The helping storage bubbles $D_1, D_2, \ldots, D_n$ send the content analysis results back to the requesting storage bubbles $D_1, D_2 \ldots, D_n$.

According to an embodiment of the invention, the storage bubbles $D_1, D_2 \ldots, D_n$ can decide to honour a content analysis help request if they have fulfilled their own profile goal. That is when all content available from any storage or other device $D_1, D_2 \ldots, D_n$, 25, 26, 27, including other storage bubbles $D_1$, $D_2, \ldots, D_n$, has been analysed and no new content was found that matches the assigned profile. Using a standard like UPnP, a storage bubble $D_1, D_2, \ldots, D_n$ can subscribe to another device 25, 26, 27, 33 to get a signal when new content is available on that device 25, 26, 27, 33. When signalled, the respective storage bubble $D_1, D_2 \ldots, D_n$ could analyse the content and decide if the content is of interest based on the assigned profile.

In principle it is also possible that a storage bubble $D_1$, $D_2, \ldots, D_n$ misses some of the content analysis capabilities that are required to fulfil its profile. In that case a storage bubble $D_1, D_2, \ldots, D_n$ can negotiate with another storage bubble $D_1, D_2, \ldots, D_n$ with the necessary capabilities to perform the content analysis.

The generated metadata of any content that is analysed is kept on the storage bubble $D_1, D_2, \ldots, D_n$ that has analysed the content. If the content analysis was done upon request of another storage bubble $D_1, D_2, \ldots, D_n$, the metadata can also be copied to the requesting storage bubble $D_1, D_2, \ldots, D_n$. The metadata are associated to content through identifying information about the content, such as file name and creation date.

By keeping the metadata of any content analysed on the storage bubbles $D_1, D_2, \ldots, D_n$ that analysed the content or has requested analysis a partially redundant distributed metadata database builds up in the network of storage bubbles. Thus, by means of the described distributed storage system 1, a distributed metadata database can be achieved.

It must be noted that the content analysis could be replaced by human annotation of the content using a user interface. This is only feasible if the metadata of interest are restricted to rudimentary information such as genre. Semi-automatic annotation techniques can result in more detailed annotations, e.g. the user can indicate in one image who is the grandmother, and the storage bubble can use this information to find and annotate the presence of the grandmother in other images.

According to an embodiment of the distributed storage system 1, a user is able to control which of the storage bubbles $D_1, D_2, \ldots, D_n$ or other devices 25, 26, 27, 33 have access control to the content stored on the storage bubbles $D_1$, $D_2, \ldots, D_n$. For instance, using uPnP, a storage bubble $D_1$, $D_2, \ldots, D_n$ can discover other devices 25, 26, 27, 33 in the network. For each device $D_1, D_2, \ldots, D_n$, 25, 26, 27, 33 the user can specify what access rights it has. Also access rules with which a user can provide general security rules, e.g. "all devices can access all music on this bubble", can be defined in the profiles of the storage bubbles $D_1, D_2 \ldots, D_n$.

Since all storage bubbles $D_1, D_2, \ldots, D_n$ can communicate and exchange data with one another all the storage bubbles $D_1, D_2, \ldots, D_n$ of the network N can be virtually represented by any device able to communicate with the storage bubbles $D_1, D_2, \ldots, D_n$.

Figure 7:
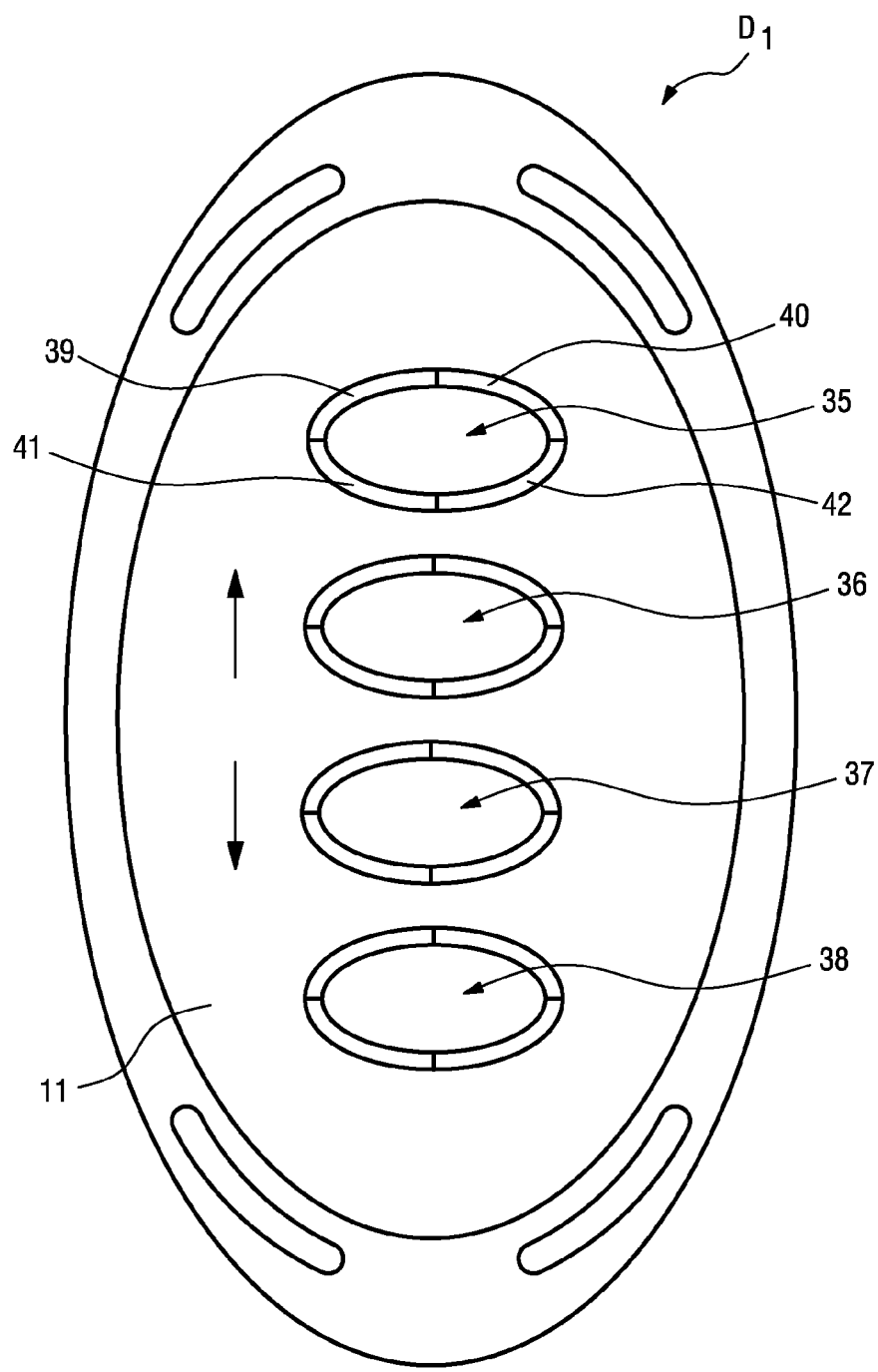
FIG. 7 shows a manager storage device according to an embodiment of the invention.

According to FIG. 7, a storage device $D_1$, such as the storage devices described in the previous figures, can browse content stored on other, remote, storage bubbles on the network. Remote storage bubbles are indicated by means of the elliptic icons 35, 36, 37, 38 shown in a display 11 of the storage device $D_1$. Each of these elliptic icons 35, 36, 37, 38 is divided into areas 39, 40, 41, 42, wherein each area 39, 40, 41, 42 indicates the content stored on the corresponding remote storage bubble. For example the area 40 represents videos, the area 41 music, the area 42 pictures and the area 39 text stored on the remote storage bubble. The colour and brightness of the areas indicates the type and amount of content stored on the remote storage device. Thus, the user can see at a glance what is stored on the remote storage devices simply by the different degrees of brightness of the areas 39, 40, 41, 42, corresponding to the illumination means described in FIGS. 1 and 3.

Also for playback of streams or viewing files, the stream or file of a remote storage bubble can be routed to the storage device $D_1$. This storage device $D_1$ can be used as a storage device manager. This "manager" storage device $D_1$ can for instance temporarily act as a master in the network N of storage bubbles shown in FIG. 6. This master storage device $D_1$ collects information from the other storage bubbles in the network N.

From the perspective of the manager device $D_1$ able to show any storage bubble in the network N, all the content in the storage network N seems to be hierarchically clustered in an intelligent way. This is because the content is intelligently clustered over multiple levels of information detail (e.g. on the highest level only a colour indicator is used on a lower level icons are used, etc.). Especially when users avail of a large amount of storage, it is of interest to have an overview of all storage bubbles in the network N. In general, from the perspective of the manager device $D_1$, the user can transparently browse the combined storage space created by all storage bubbles on the network N; thus the user does not have to know on which storage bubble a certain content of interest is stored.

Figure 8:
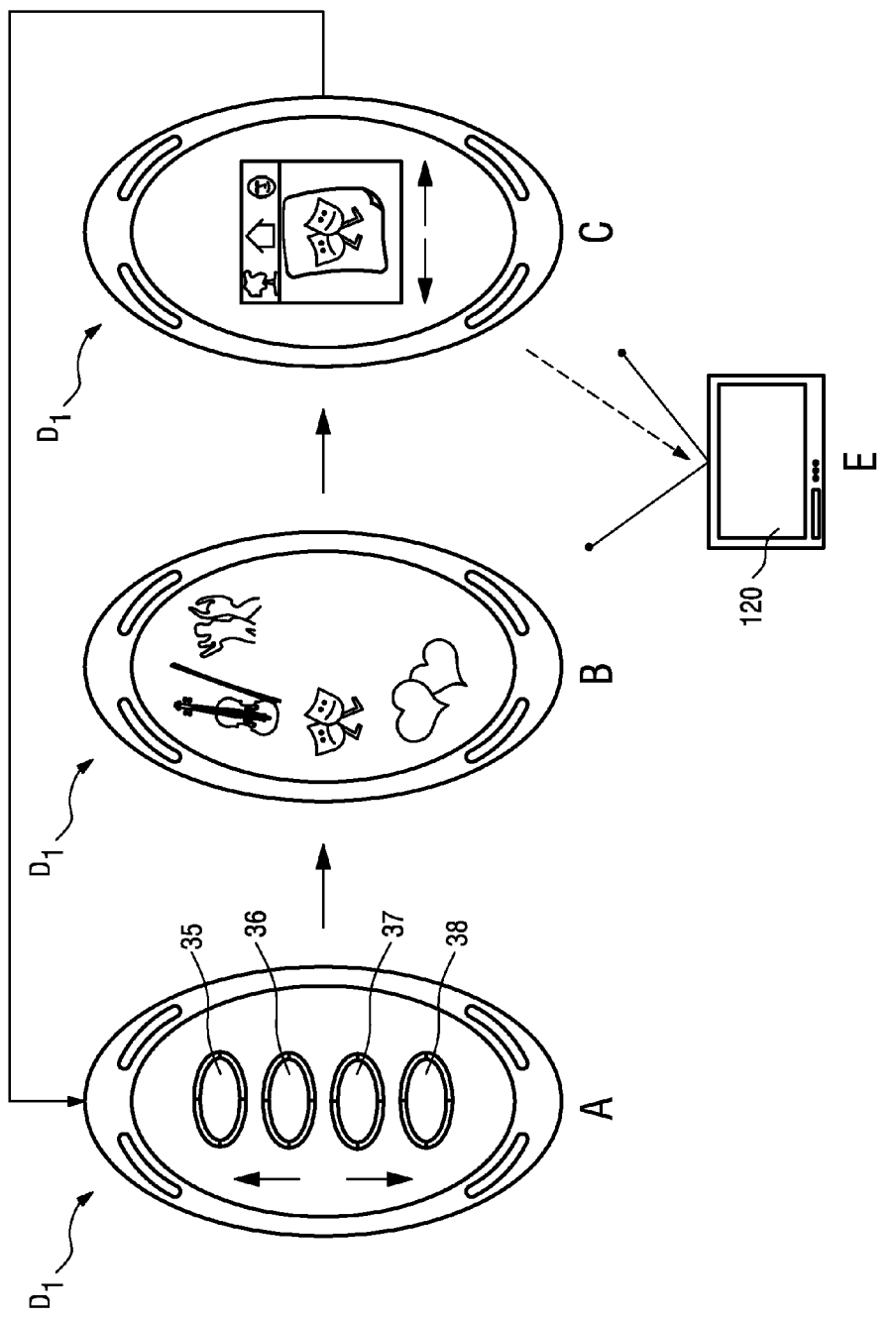
FIG. 8 shows a number of stages in a content retrieval procedure carried out by a portable storage device according to an embodiment of the invention.

FIG. 8 shows a method for the retrieval of a desired content using the manager device $D_1$ providing an overview of all the storage bubbles in the distributed storage system 1, as described in FIG. 5 or 6, by giving rudimentary visual information about what is stored on the storage bubbles (step A) in its display. By selecting one of the icons 35, 36, 37, 38, each representing a storage bubble in the network N, e.g. via point-and-click or touch, more information about the content stored on the selected storage bubble can be provided. For example, if the user clicks on the icon, say icon 35, representing storage device $D_2$, information about the content stored on storage device $D_2$ will be displayed (steps B, C).

The user interface of the selected storage bubble $D_2$ can be routed to and shown on the manager device $D_1$. In this way, using a storage bubble as a storage bubble manager, a user can remotely perform search actions such as described in FIG. 4. Furthermore, the device manager $D_1$ can route audio and video streamed from the remote storage bubble $D_2$ to a suitable rendering device 120, such as a television 120 (step E).

Thus the manager device $D_1$ can act as a virtual representation of a remote storage bubble. If a user does not want to physically get a certain storage bubble, he can simply pick up the nearest storage bubble and use this as a virtual representation of the desired storage bubble. To provide the manager functionality described above, each of the storage bubbles can comprise a respective software installed in their processors. In a preferred embodiment, a user can choose from a menu shown on the display of the storage device held in his hand, e.g. the storage device $D_1$, the menu item "make this bubble a bubble manager". After activating this menu item the storage device $D_1$ can send, via its communication means, requests to the other bubbles in the network N to transmit information about their contents. Metadata about content on storage bubbles that do not react could be replaced by information that is available in the local metadata database of the storage bubble acting as manager; the content of the non-responsive bubbles of course remains unreachable. The storage bubble manager $D_1$ could indicate this. Further, it could be possible that content of the non-responsive bubble is available on any other bubble that is reachable. When a user selects content of a storage bubble that is unreachable the manager storage device $D_1$ could select a copy of the selected content on another bubble that is reachable.

Figure 9:
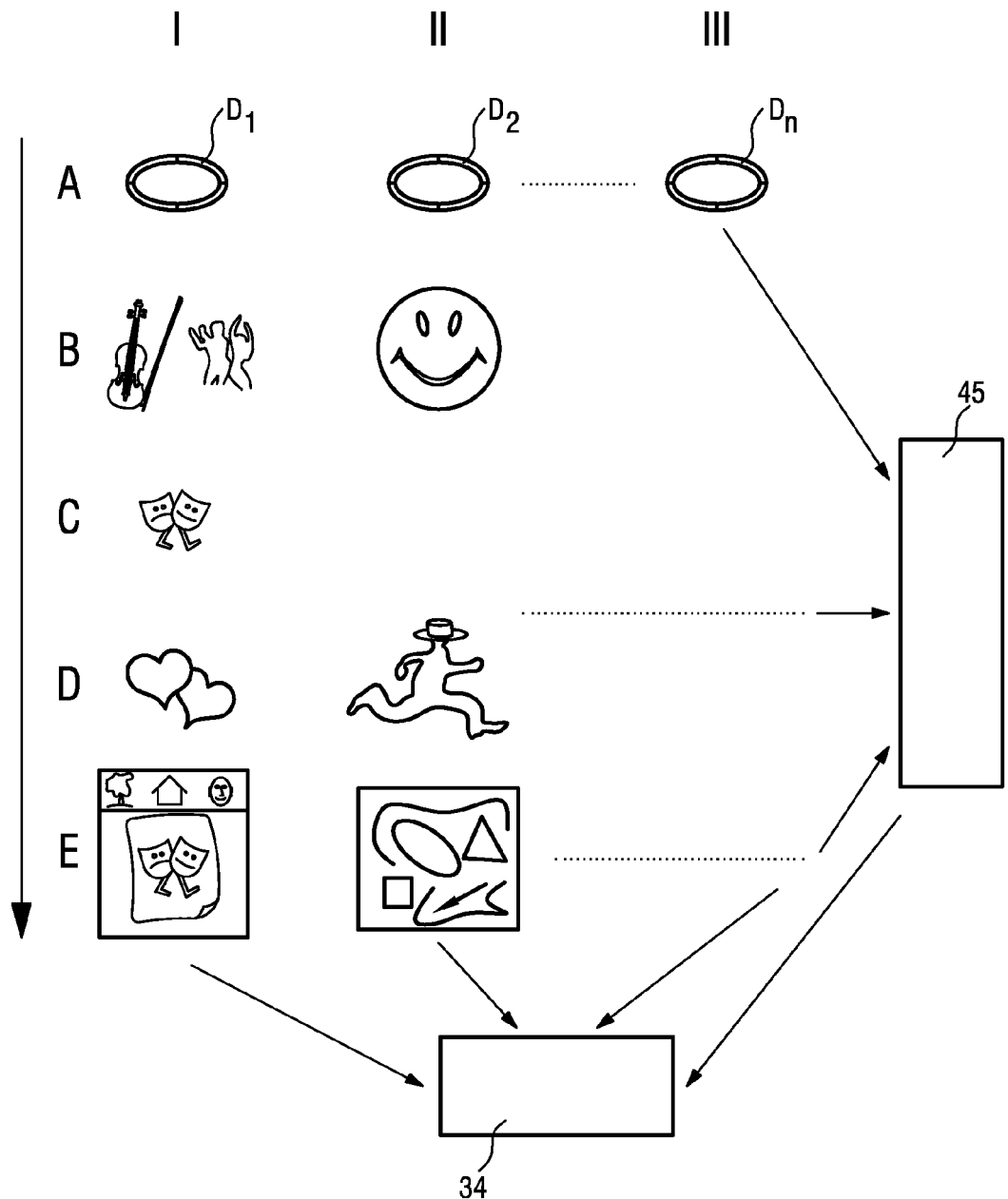
FIG. 9 shows a method of representing content stored in the distributed storage system according to an embodiment of the invention.

The content stored in the storage bubble network N can be represented in a hierarchical manner as shown in FIG. 9. In FIG. 9, the synergy between virtual and physical representation of storage bubbles $D_1, D_2, \ldots, D_n$ is shown. Per column I, II, III, the content is physically segmented on different storage bubbles $D_1, D_2, \ldots, D_n$. Per row A, B, C, D, E the content is virtually segmented at multiple content representation levels. The row A represents the content in a most rudimentary way, wherein the degree of granularity is becoming finer in the direction of the arrow. Thus, row E represents the finest content granularity.

According to FIG. 9, all the content available in the storage bubble network N is logically clustered in an intelligent way, e.g. by means of the bubble manager $D_1$. The intelligent clustering of content is also performed by using the metadata provided by the storage bubbles $D_1, D_2, \ldots, D_n$, wherein similar contents are assigned to clusters 45 of multiple levels of granularity. So videos stored in the storage bubble network N can constitute a cluster. This cluster can be divided into sub-clusters such as action movies or comedies etc. These sub-clusters can be divided in further sub-clusters according to, for instance, actors who play in the movies, etc. All this information used for clustering is available in the form of metadata.

Also, the content analysis processing in the distributed storage system 1 or the network N of storage bubbles $D_1$, $D_2, \ldots, D_n$ can be done centrally by a master device too, e.g. on the storage bubble manager $D_1$.

Figure 10:
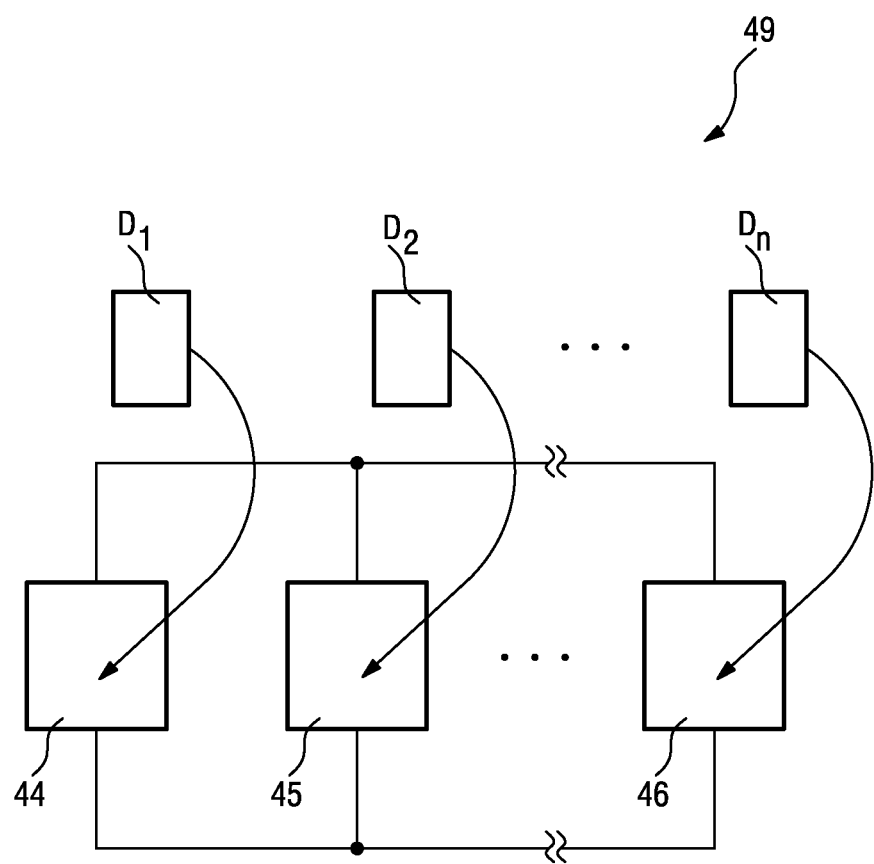
FIG. 10 shows a grid tray for a number of storage devices.Text

Furthermore, instead of having the bubbles just lying around, the bubbles $D_1, D_2, \ldots, D_n$ could be inserted in collets or slots, respectively, of a kind of grid-tray 49 connected or connectable to the storage bubble manager $D_1$ as shown in FIG. 10. In this way, power can be supplied by the bubble manager $D_1$ and possibly also all communication between the bubbles $D_1, D_2, \ldots, D_n$ could be handled. The storage bubbles $D_1, D_2, \ldots, D_n$ can comprise according to this embodiment of the invention connection means corresponding with connection means of the grid tray to provide bus bar or data bus connections, e.g. metal sheets. The grid tray 49 can comprise retainers 44, 45, 46 for the storage bubbles $D_2, \ldots, D_n$ and the management device $D_1$ into which the bubbles $D_2, \ldots, D_n$ and the management device $D_1$ can be placed. The power for the storage bubbles $D_1, D_2, \ldots, D_n$ can be supplied by means of the grid tray 49 itself too, e.g. the grid tray can comprise a power supply. Alternatively the grid tray 49 can be connected to the public electricity network, e.g. by means of a suitable current adapter.

In the embodiment using the grid tray 49 the storage bubbles $D_1, D_2, \ldots, D_n$ can be very simple. The simplest forms are storage bubbles $D_1, D_2, \ldots, D_n$ only containing storage, a small display and/or other indication methods and a processor.

The storage devices described above, and a distributed storage system as described and comprising such storage devices, can offer to the user a practical and easy-to-use way of acquiring and managing large collections of content. A user need only specify what he would like to have collected by a portable storage device, and then need not concern himself further. He can take the portable storage device with him to another location, and rest assured that other storage devices are collecting the specified content in his absence.

Although the present invention has been disclosed in the form of preferred embodiments and variations thereon, it will be understood that numerous additional modifications and variations could be made thereto without departing from the scope of the invention. For example, a storage device of a distributed storage system can delegate responsibility for its autonomous function to a storage device that is about to leave the distributed storage system. The delegated storage device can then collect content for the autonomous function of the delegating storage device in another network, and then transfer this content back to the delegating storage device upon returning to the original network. In this way, a storage device can expand its content collection simply by giving other storage devices a "shopping list" when they leave the network.

For the sake of clarity, it is to be understood that the use of "a" or "an" throughout this application does not exclude a plurality, and "comprising" does not exclude other steps or elements. A "unit" or "module" can comprises a number of units or modules, unless otherwise stated.

The invention claimed is:

1. A method of managing a distributed storage system comprising a plurality of storage devices $(D_1, D_2, \ldots, D_n)$ on a network (N), the method comprising:
assigning an autonomous function to any storage device $(D_1, D_2, \ldots, D_n)$ of the distributed storage system, wherein each respective storage device possesses intelligence of its own for execution of a corresponding autonomous function, wherein the autonomous function comprises collecting and providing content according to a configurable profile for the respective storage device $(D_1, D_2, \ldots, D_n)$ to which the autonomous function is assigned;
delegating responsibility for the autonomous function of a first storage device $(D_1, D_2, \ldots, D_n)$ of the distributed storage system, before the first storage device (a)(i) leaves the network (N), (a)(ii) becomes absent from the network, and (a)(iii) is unable to carry out its autonomous function, to a second storage device $(D_1, D_2, \ldots, D_n)$ of the distributed storage system, wherein delegating comprises supplying to the second storage device, via the configurable profile, information about content already collected by the first storage device;
assuming responsibility for the autonomous function of the first storage device $(D_1, D_2, \ldots, D_n)$ by the second storage device when the first storage device leaves the network, wherein assuming responsibility comprises (b) determining (b)(i) which content to collect and (b)(ii) which content not to collect because corresponding content is already stored on the first storage device, and (c) only collecting new content not already stored on the first storage device; and
transferring data from the second storage device, corresponding to data accumulated by the second storage device due to the second storage device's responsibility for the autonomous function of the first storage device $(D_1, D_2, \ldots, D_n)$, to the first storage device $(D_1, D_2, \ldots, D_n)$ when the first storage device $(D_1, D_2, \ldots, D_n)$ returns to the network (N).

2. The method according to claim 1, wherein the delegation of responsibility for an autonomous function of a first storage device $(D_1, D_2, \ldots, D_n)$ to a second storage device $(D_1, D_2, \ldots, D_n)$ comprises transferring, via the configurable profile, profile-related information from the first storage device $(D_1, D_2, \ldots, D_n)$ to the second storage device $(D_1, D_2, \ldots, D_n)$.

3. The method according to claim 2, wherein the profile-related information of a storage device $(D_1, D_2, \ldots, D_n)$ specifies the type of content to be collected for that storage device $(D_1, D_2, \ldots, D_n)$.

4. The method according to claim 2, wherein the profile-related information of a storage device $(D_1, D_2, \ldots, D_n)$ comprises metadata describing the content stored by that storage device $(D_1, D_2, \ldots, D_n)$.

5. The method according to claim 2, wherein profile-related information is transferred from a first storage device $(D_1, D_2, \ldots, D_n)$ to a second storage device $(D_1, D_2, \ldots, D_n)$ prior to a trigger event, wherein the trigger event causes the second storage device $(D_1, D_2, \ldots, D_n)$ to assume responsibility for the autonomous function of the first storage device $(D_1, D_2, \ldots, D_n)$.

6. The method according to claim 2, wherein a second storage device $(D_1, D_2, \ldots, D_n)$ is chosen by a first storage device $(D_1, D_2, \ldots, D_n)$ on the basis of a reliability value, wherein the reliability value is a measure of the suitability of the second storage device $(D_1, D_2, \ldots, D_n)$ for assuming responsibility for the autonomous function of the first storage device $(D_1, D_2, \ldots, D_n)$.

7. The method according to claim 2, wherein the second storage device $(D_1, D_2, \ldots, D_n)$ automatically assumes responsibility for a first storage device $(D_1, D_2, \ldots, D_n)$ upon occurrence of a trigger event caused when a user removes the first storage device $(D_1, D_2, \ldots, D_n)$ from the network (N).

8. The method according to claim 7, wherein data, accumulated by the second storage device $(D_1, D_2, \ldots, D_n)$ due to its responsibility for the autonomous function for the first storage device $(D_1, D_2, \ldots, D_n)$, is automatically transferred from the second storage device $(D_1, D_2, \ldots, D_n)$ to the first storage device $(D_1, D_2, \ldots, D_n)$ once a user returns the first storage device $(D_1, D_2, \ldots, D_n)$ to the network (N).

9. The method according to claim 2, wherein a storage device $(D_1, D_2, \ldots, D_n)$ is prevented, by means of a user input, from delegating the responsibility for its autonomous function to a second storage device $(D_1, D_2, \ldots, D_n)$.

10. A storage device $(D_1, D_2, \ldots, D_n)$ for use in a distributed storage system comprising:
a processor;
an interface for connecting to an external data source;
a data acquisition unit for acquiring data, from the external data source, according to a configurable profile describing an autonomous function of the storage device $(D_1, D_2, \ldots, D_n)$, wherein each respective storage device possesses intelligence of its own for execution of a corresponding autonomous function;

a memory module for storing data;

an interface for communicating with another storage device ($D_1, D_2, \ldots, D_n$) of the distributed storage system; and a responsibility delegation unit for delegating the responsibility for the autonomous function of the storage device ($D_1, D_2, \ldots, D_n$) to the another storage device ($D_1, D_2, \ldots, D_n$) in a network (N) of the distributed storage system, prior to the storage device ($D_1, D_2, \ldots, D_n$) (a)(i) leaving the network (N), (a)(ii) becoming absent from the network, and (a)(iii) being unable to carry out its autonomous function, wherein the responsibility delegating unit further comprises means for supplying to the another storage device, via the configurable profile, information about content already collected by the storage device, wherein (b)(i) responsive to the storage device ($D_1, D_2, \ldots, D_n$) leaving the network, the another storage device ($D_1, D_2, \ldots, D_n$) assumes responsibility for the autonomous function of the first storage device ($D_1, D_2, \ldots, D_n$), wherein assuming responsibility comprises (c) determining (c)(i) which content to collect and (c)(ii) which content not to collect because corresponding content is already stored on the storage device, and (d) only collecting new content not already stored on the storage device, and (b)(ii) responsive to the storage device ($D_1, D_2, \ldots, D_n$) returning to the network (N), the another storage device ($D_1, D_2, \ldots, D_n$) transfers data from the another storage device, corresponding to data accumulated by the second storage device due to the another storage device's responsibility for the autonomous function of the storage device ($D_1, D_2, \ldots, D_n$), to the storage device ($D_1, D_2, \ldots, D_n$).

11. The storage device ($D_1, D_2, \ldots, D_n$) according to claim 10, further comprising a responsibility assumption unit for assuming the responsibility for the autonomous function of another storage device ($D_1, D_2, \ldots, D_n$) and for causing the data acquisition unit to acquire data from the external data source according to a configurable profile describing the autonomous function of the another storage device ($D_1, D_2, \ldots, D_n$) and for transferring data, accumulated during its responsibility for the autonomous function of the another storage device ($D_1, D_2, \ldots, D_n$), to the another storage device ($D_1, D_2, \ldots, D_n$) once the another storage device ($D_1, D_2, \ldots, D_n$) has returned to the network (N).

12. A storage device ($D_1, D_2, \ldots, D_n$) for use in a distributed storage system comprising:

a processor;

an interface for connecting to an external data source;

a data acquisition unit for acquiring data, from the external data source, according to a configurable profile describing an autonomous function of the storage device ($D_1, D_2, \ldots, D_n$), wherein each respective storage device possesses intelligence of its own for execution of a corresponding autonomous function;

a memory module for storing data;

an interface for communicating with another storage device ($D_1, D_2, \ldots, D_n$); and a responsibility assumption unit (i) for assuming the responsibility for the autonomous function of another storage device ($D_1, D_2, \ldots, D_n$) prior to the another storage device ($D_1, D_2, \ldots, D_n$) (i)(a)(1) leaving a network (N) of the distributed storage system, (i)(a)(2) becoming absent from the network, and (i)(a)(3) being unable to carry out its autonomous function, wherein the responsibility assumption unit further comprises means for receiving from the another storage device, via the configurable profile, information about content already collected by the storage device, (ii) for causing, in response to the another storage device ($D_1, D_2, \ldots, D_n$) leaving the network (N), the data acquisition unit to acquire data from the external data source according to a configurable profile describing the autonomous function of the another storage device ($D_1, D_2, \ldots, D_n$), wherein assuming responsibility in causing the data acquisition unit to acquire data further comprises (ii)(a) determining (ii)(a)(1) which content to collect and (ii)(a)(2) which content not to collect because corresponding content is already stored on the another storage device, and (ii)(b) only collecting new content not already stored on the another storage device, and (iii) for transferring data, accumulated during its responsibility for the autonomous function of the first storage device ($D_1, D_2, \ldots, D_n$), to the another storage device ($D_1, D_2, \ldots, D_n$) once the another storage device ($D_1, D_2, \ldots, D_n$) has returned to the network (N).

13. A distributed storage system comprising:

at least a first storage device ($D_1, D_2, \ldots, D_n$), wherein the first storage device ($D_1, D_2, \ldots, D_n$) comprises:

a processor;

an interface for connecting to an external data source;

a data acquisition unit for acquiring data, from the external data source, according to a configurable profile describing an autonomous function of the first storage device ($D_1, D_2, \ldots, D_n$), wherein each respective storage device possesses intelligence of its own for execution of a corresponding autonomous function;

a memory module for storing data;

an interface for communicating with another storage device ($D_1, D_2, \ldots, D_n$) of the distributed storage system; and a responsibility delegation unit for delegating the responsibility for the autonomous function of the first storage device ($D_1, D_2, \ldots, D_n$) to the another storage device ($D_1, D_2, \ldots, D_n$) in a network (N) of the distributed storage system, prior to the first storage device ($D_1, D_2, \ldots, D_n$) (a)(i) leaving the network (N), (a)(ii) becoming absent from the network, and (a)(iii) being unable to carry out its autonomous function, wherein the responsibility delegating unit further comprises means for supplying to the another storage device, via the configurable profile, information about content already collected by the first storage device, wherein (b)(i) responsive to the first storage device ($D_1, D_2, \ldots, D_n$) leaving the network, the another storage device ($D_1, D_2, \ldots, D_n$) assumes responsibility for the autonomous function of the first storage device ($D_1, D_2, \ldots, D_n$), wherein assuming responsibility comprises (c) determining (c)(i) which content to collect and (c)(ii) which content not to collect because corresponding content is already stored on the first storage device, and (d) only collecting new content not already stored on the storage device, and (b)(ii) responsive to the first storage device ($D_1, D_2, \ldots, D_n$) returning to the network (N), the another storage device ($D_1, D_2, \ldots, D_n$) transfers data from the another storage device, corresponding to data accumulated by the second storage device due to the another storage device's responsibility for the autonomous function of the first storage device ($D_1, D_2, \ldots, D_n$), to the first storage device ($D_1, D_2, \ldots, D_n$); and at least a second storage device (D1, D2, ..., Dn) according to claim 12.

14. A computer program product comprising a non-transitory computer readable medium directly loadable into the memory of a programmable storage device ($D_1, D_2, \ldots, D_n$) for use in a distributed storage system, comprising software code portions for performing the steps of a method according to claim 1 when said product is run on the storage device ($D_1, D_2, \ldots, D_n$).

* * * * *